(12) United States Patent
Li et al.

(10) Patent No.: US 11,847,723 B1
(45) Date of Patent: Dec. 19, 2023

(54) POLYGON EDGE MATCHING WITH GEOMETRIC OPERATIONS

(71) Applicant: Tableau Software, LLC, Seattle, WA (US)

(72) Inventors: Zhengxiao Li, Kirkland, WA (US); Daniel Robert Strebe, Seattle, WA (US); Matthew Nathaniel Kenny, Seattle, WA (US); Jimmy Y Sun, Redmond, WA (US); Bryan Harold Haber, Lynnwood, WA (US); Ryan Milton Whitley, Seattle, WA (US); Aysegul Yeniaras-Kramer, Kirkland, WA (US); Steven Richard Hollasch, Redmond, WA (US)

(73) Assignee: Tableau Software, LLC, Seattle, WA (US)

( * ) Notice: Subject to any disclaimer, the term of this patent is extended or adjusted under 35 U.S.C. 154(b) by 27 days.

(21) Appl. No.: 17/588,181

(22) Filed: Jan. 28, 2022

(51) Int. Cl.
*G06T 11/20* (2006.01)
*G06T 3/40* (2006.01)
*G01C 21/00* (2006.01)
*G06F 3/04845* (2022.01)

(52) U.S. Cl.
CPC ........ *G06T 11/203* (2013.01); *G01C 21/3867* (2020.08); *G06F 3/04845* (2013.01); *G06T 3/40* (2013.01); *G06F 2203/04806* (2013.01); *G06T 2200/24* (2013.01)

(58) Field of Classification Search
CPC ..... G06T 11/203; G06T 3/40; G06T 2200/24; G01C 21/3867; G06F 3/04845; G06F 2203/04806
See application file for complete search history.

(56) References Cited

U.S. PATENT DOCUMENTS

| | | | |
|---|---|---|---|
| 2015/0170386 A1* | 6/2015 | Chawathe | G06T 1/20 345/619 |
| 2017/0090460 A1* | 3/2017 | Andrew | B29C 64/386 |
| 2022/0390255 A1* | 12/2022 | Donato | G06T 19/20 |

* cited by examiner

*Primary Examiner* — William A Beutel
(74) *Attorney, Agent, or Firm* — Morgan, Lewis & Bockius LLP

(57) ABSTRACT

This application is directed to matching edges of polygons representing neighboring regions in a map user application. A computer system obtains a first polygon and a second polygon, and the second polygon is connected to the first polygon via polygon edges that are at least partially mismatched. Automatically and without user intervention, the computer system combines the first polygon and the second polygon to form a joined polygon defined by an outline of the first polygon and the second polygon. A region defined by the second polygon is subtracted from a region defined by the joined polygon to form a new region. The computer system defines an updated first polygon as an outline of the new region and renders, on a screen, the updated first polygon and the second polygon with matching edges.

20 Claims, 15 Drawing Sheets

POLYGON EDGE MATCHING WITH GEOMETRIC OPERATIONS

TECHNICAL FIELD

The disclosed implementations relate generally to data visualization and more specifically to systems and methods that automatically match edges of polygons representing neighboring regions in a data visualization application (e.g., a map user application).

BACKGROUND

A data visualization application often uses polygons represent different data items and requires two polygons having mismatched edges to be disposed immediately adjacent to each other. For example, a map user application often uses polygons to represent different geographical regions on a map. Such polygons are simplified with less vertices when polygon data associated with the map is published to customers, and only some of the polygon vertices are kept for each country. A larger country tends to have fewer of its polygon vertices published than another smaller country. Neighboring polygon vertices are connected by longer border segments in the larger country. When the larger country and the smaller country are neighboring to each other, borders between these two countries are at least partially mismatched with gaps and overlaps located on the borders.

Edge matching is a process of tightly joining boundaries between two polygons to eliminate the gaps and overlaps during the course of rendering two neighboring geographical regions (e.g., two countries). In some situations, edge matching is done manually and may take hours or days, depending on a length of a border connecting the two neighboring geographical regions. Alternatively, in some situations, polygonal vertices are digitized and automatically snapped together if their distances are within a predefined vertex snapping tolerance. Such tolerance-based edge matching has a relatively low accuracy level and often causes invalid polygons that requires tedious manual correction. Because of this, there is a need for techniques to efficiently and accurately match edges of neighboring polygons that are rendered to represent different geographical regions on a graphical user interface (GUI) of a map user application.

SUMMARY

Accordingly, some implementations of this application are directed to applying geometric operations to match edges of polygons that are rendered to represent different geographical regions on a data visualization user interface of a map user application. Matching edges are automatically formed among neighboring polygonal regions using union and intersection operations. In one example, these geometric operations eliminate 99.9% of the gaps and overlaps associated with mismatching borders that are provided in the map user application for the Netherlands, Belgium, and Germany, and no or little manual work is needed subsequently to these geometric operations to complete a task of matching edges of the polygons representing the Netherlands, Belgium, and Germany.

In accordance with some implementations, a method is implemented at a computer system having a screen, one or more processors, and memory storing one or more programs configured for execution by the one or more processors. The method includes obtaining a first polygon and a second polygon. The second polygon is connected to the first polygon via polygon edges that are at least partially mismatched. The method further includes automatically and without user intervention, combining the first polygon and the second polygon to form a joined polygon defined by an outline of the first polygon and the second polygon, subtracting a region defined by the second polygon from a region defined by the joined polygon to form a new region, defining an updated first polygon as an outline of the new region, and rendering, on the screen, the updated first polygon and the second polygon with matching edges.

In some implementations, a computer system includes a screen, one or more processors, and memory. The memory stores one or more programs configured for execution by the one or more processors, and the one or more programs include instructions for implementing any of the methods described herein.

In some implementations, a non-transitory computer readable storage medium stores one or more programs configured for execution by a computer system having a screen, one or more processors, and memory. The one or more programs include instructions for implementing any of the methods described herein.

In some implementations, the method includes executing a map user application and displaying a map on a first user interface of the map user application on the screen, and the map includes the first polygon and the second polygon. For example, borders of two countries are at least partially mismatched and form gaps and overlaps. A first country is represented by a group of first polygons having matching edges, and a second country is represented by a group of second polygons having matching edges. In some implementations, each first polygon is matched to any second polygon connected to the respective first polygon. In some implementations, each second polygon is matched to any first polygon connected to the respective second polygon. The first polygons represent counties or provinces of the first country, and the second polygons represent counties or provinces of the second country. Further, in some situations, when a first polygon is connected to one or more neighboring second polygons along the mismatched border, a union operation is implemented to combine a region of the first polygon and regions of the one or more neighboring second polygons to form a joined polygon. In some implementations, the joined polygon encloses one or more holes, and the one or more holes are removed. The neighboring second polygons are further joined and subtracted from the joined polygon. By these means, the map user application is configured to present geographical regions corresponding to the first polygon and its neighboring second polygons with matching edges, automatically and without user intervention.

BRIEF DESCRIPTION OF THE DRAWINGS

The patent or application file contains at least one drawing executed in color. Copies of this patent or patent application publication with color drawings will be provided by the Office upon request and payment of the necessary fee.

For a better understanding of the aforementioned systems, methods, and graphical user interfaces, as well as additional systems, methods, and graphical user interfaces that provide techniques for modifying display of data visualizations, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
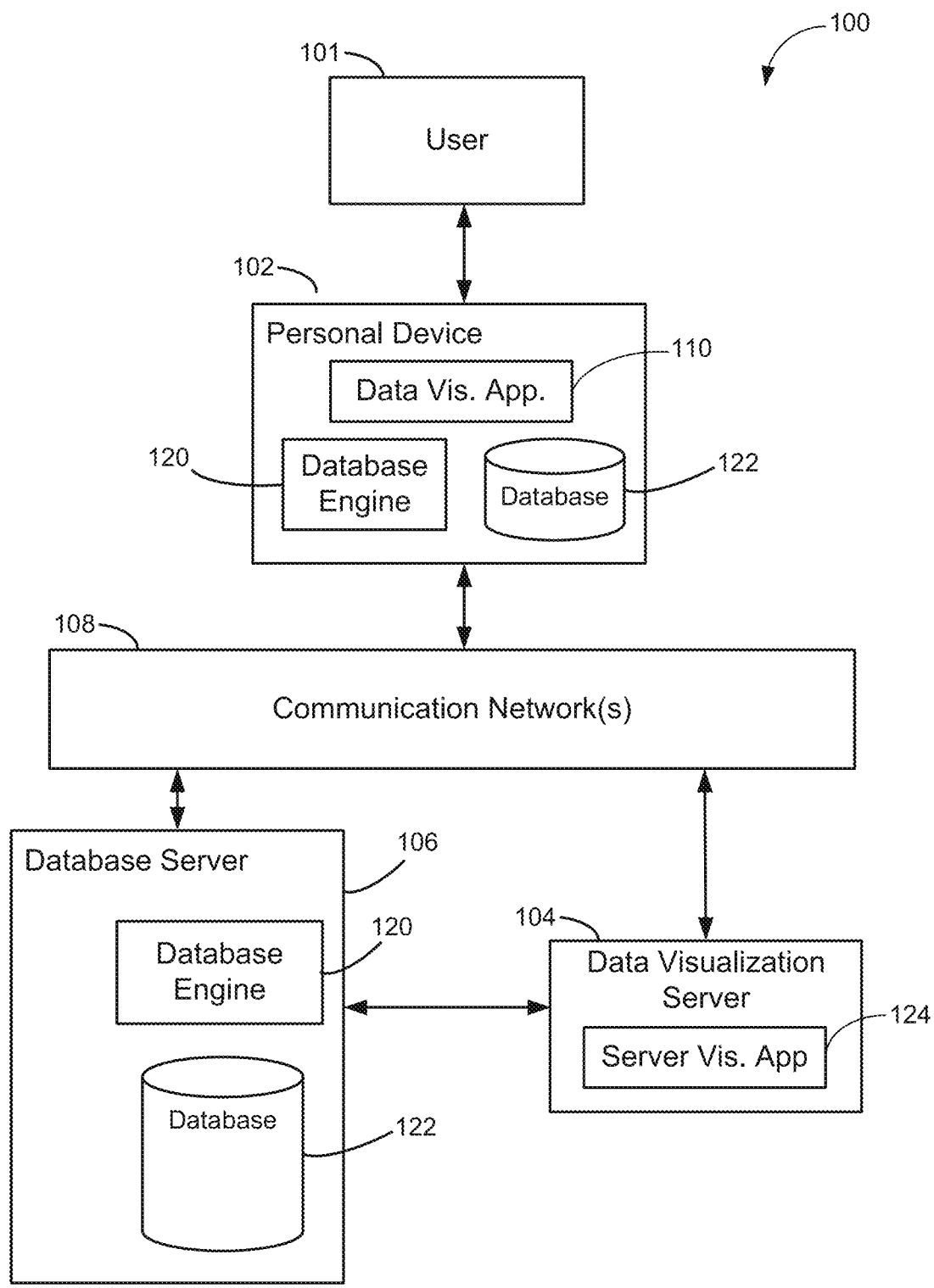
FIG. 1 illustrates a data visualization environment in which data is visualized according to configuration parameters selected by a user.

FIG. 1 illustrates a data visualization environment 100 in which data is visualized according to configuration parameters selected by a user. A user 101 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that are executed on the system 200. In some implementations, the personal device 102 includes one or more desktop data sources (e.g., CSV files or spreadsheet files). In some implementations, the personal device 102 includes a database engine 120, which provides access to one or more databases 122 (e.g., SQL databases). Data stored in the databases 122 of the personal device 102 is retrieved in accordance with database queries received by the database engine 120. In some implementations, the personal device 102 includes a data visualization application 110, which the user 101 uses to create data visualizations from the desktop data sources and/or the databases 122. For example, the data visualization application 110 of the personal device 102 generates a database query for a data visualization, and sends the database query to the database engine 120. The database engine 120 then retrieves data stored in the database 122 in response to the database query. Upon receiving the retrieved data from the database engine 120, the data visualization application 110 visualizes the retrieved data locally, thereby enabling the user 101 to visualize the data that is stored locally on the personal device 102.

In some implementations, the personal device 102 connects to one or more external database servers 106 and/or a data visualization server 104. Each of the one or more database servers 106 includes a database engine 120 configured to access one or more databases 122 that are stored at the respective database server 106. In some implementations, the data visualization server 104 includes a database engine 120 and one or more databases 122, and the database engine 120 is configured to access one or more databases 122 of the data visualization server 104.

In some implementations, data visualization functionality is implemented only by the data visualization application 110 of the personal device 102 locally. In some implementations, the data visualization functionality is provided collectively by the local data visualization application 110 and a server visualization application 124 located at the remote data visualization server 104, particularly when corresponding data retrieval or visualization involves resource intensive operations that are preferably implemented at a specialized server. In this situation, the user 101 may initiate a data visualization process using the local data visualization application 110 of the personal device 102. One or more requests are received through a data visualization interface of the application 110 and sent to the data visualization server 104 to generate data visualization results by the server visualization application 124.

In some implementations, data is provided by a live data stream and visualized in the data visualization application 110 of the personal device 102 and/or the data visualization server 104. Earlier data items of the data stream are retrieved from the database 122 of the personal device 102 or the database server 106, and visualized in the personal device 102 or the data visualization server 106, concurrently while subsequent data items of the data stream are generated and stored into the databases 122 of the personal device 102 and/or the database server 104. In some situations, the data items in the live data stream are not stored into the database 120 prior to visualization. Rather, the data items in the data stream are cached in a cache of the personal device 102 or the data visualization server 104. The earlier data items of the data stream are retrieved from the cache and visualized by the personal device 102 or the data visualization server 104, concurrently while the subsequent data items of the data stream are generated and stored into the cache. Data items in the live data stream are generated and provided by the personal device 102, the data visualization server 104, other client devices that are communicatively coupled to the personal device 102 and the data visualization server 104 via one or more communication networks 108 (wired or wireless), or any combination thereof.

In some implementations, the personal device 102 connects to the external database servers 106 and/or the data visualization server 104 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like. In some implementations, the data visualization server 104 provides a data visualization web application that runs within a web browser 220 on the personal device 102.

In accordance with some implementations, a computer system (e.g., the personal device 102 or the data visualization server 104) displays a data visualization user interface 300 for a user 101. The user selects one or more data sources for a data visualization and defines various configuration parameters for the data visualization. Some of the configuration parameters are set by assigning one or more data fields from the data source. For example, the x and y position of visual marks can be specified according to data fields placed onto the columns shelf 320 and rows shelf 322 in the user interface. The user can also use an axis configuration window to specify how the axes of the data visualization are displayed. Based on the user-selected configuration parameters, the data visualization application 110 displays a data visualization, including axes that may be scaled according to a logarithmic scaling or a symmetric logarithmic scaling.

In some implementations, the data visualization application 110 includes a map user application 110 configured to render a map on the data visualization user interface 300. The database 122 stores a plurality of map data items for the map user application 110, and the map data items are associated with different regions on the map. When the map user application 110 is executed on the personal device 102, the map user application 110 obtains one or more map data items and renders a subset or all of the map on the data visualization user interface 300. Further, in some implementations, an interactive map is rendered on the data visualization user interface 300 with a plurality of user-selectable affordance items. In response to a user action on the user-selectable affordance items or the interactive map, the map user application 110 adaptively renders the map. This application is directed to applying geometric operations (e.g., union, intersection or subtraction) to match edges of polygons that are rendered to represent different geographical regions on the map. For example, in response to a user request to zoom into a border region between two countries, two polygons that are located in the border region and associated with the two countries are processed to match edges, such that the polygons are enlarged and visualized with matching edges on the data visualization user interface 300 of the map user application 110.

Figure 2:
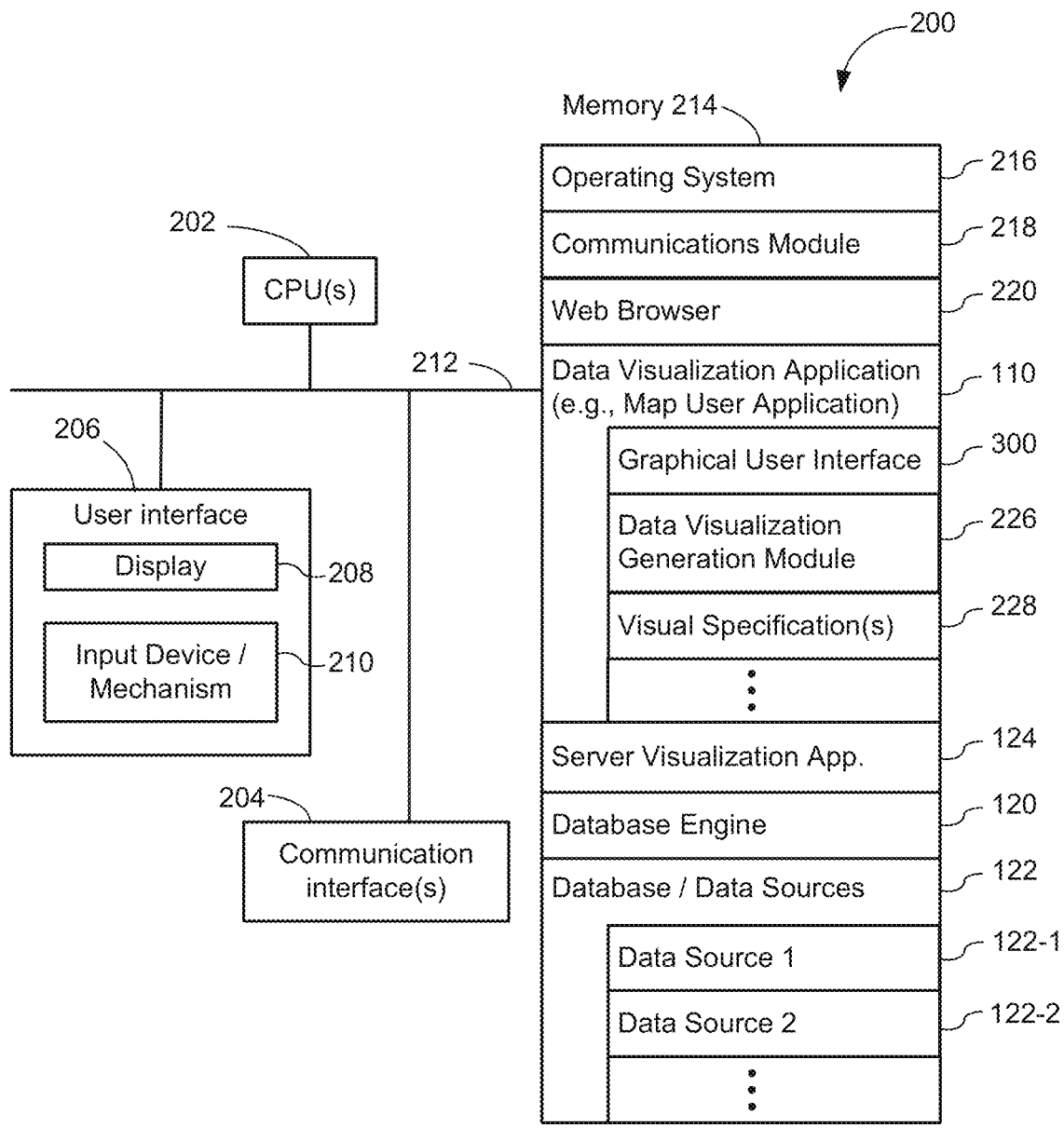
FIG. 2 is a block diagram illustrating a computer system that can display a graphical user interface for a data visualization application, in accordance with some implementations.

FIG. 2 is a block diagram illustrating a computer system 200 that can display a data visualization user interface 300, in accordance with some implementations. Various examples of the computer system 200 include a desktop computer, a laptop computer, a tablet computer, and other computer devices that have a display and a processor capable of running a data visualization application 110. The computer system 200 includes personal devices 102 and data visualization servers 104. The computer system 200 typically includes one or more processing units/cores (CPUs) 202 for executing modules, programs, and/or instructions stored in the memory 214 and thereby performing processing operations, one or more network or other communications interfaces 204; memory 214 and one or more communication buses 212 for interconnecting these components. The communication buses 212 may include circuitry that interconnects and controls communications between system components.

The computer system 200 includes a user interface 206 comprising a display device 208 (i.e., including a screen) and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 110, which provides a data visualization user interface 300 (FIG. 3A) for a user to construct visual graphics (e.g., a user interface including affordances and an interactive map) and includes at least:

- a data visualization generation module 226, which takes the user input (e.g., a visual specification 228) and generates a corresponding visual graphic (also referred to as a "data visualization" or a "data viz") for display in the user interface 300; and
- a server visualization application 124, which provides ancillary processing to the data visualization application 110 (e.g., performing processor intensive operations or delivering web pages for the data visualization application 110 when it is running in a web browser);
- a database engine 120, which receives database queries, generates execution plans, executes the generated execution plans to retrieve data from local or remote databases, and returns results corresponding to the received database queries; and
- zero or more databases or data sources 122 (e.g., a first data source 122-1 and a second data source 122-2), which are used by the data visualization application 110. In some implementations, the data sources are stored as spreadsheet files, CSV files, XML, files, or flat files, JSON files, cloud storage, or stored in a relational database.

In some implementations, the user interface 300 allows a user to select one or more data sources 122 (which may be stored on the computer system 200 or stored remotely in the database server 106), and select data fields for use in a visual graphic based on the one or more databases 122. In some implementations, the information the user provides is stored in the memory 214 as a visual specification 228. In some implementations, the data visualization application 110 executes as a standalone application (e.g., a desktop application). In some implementations, the data visualization application 110 executes within the web browser 220 or another application using web pages provided by a web server application on the visualization server 104.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
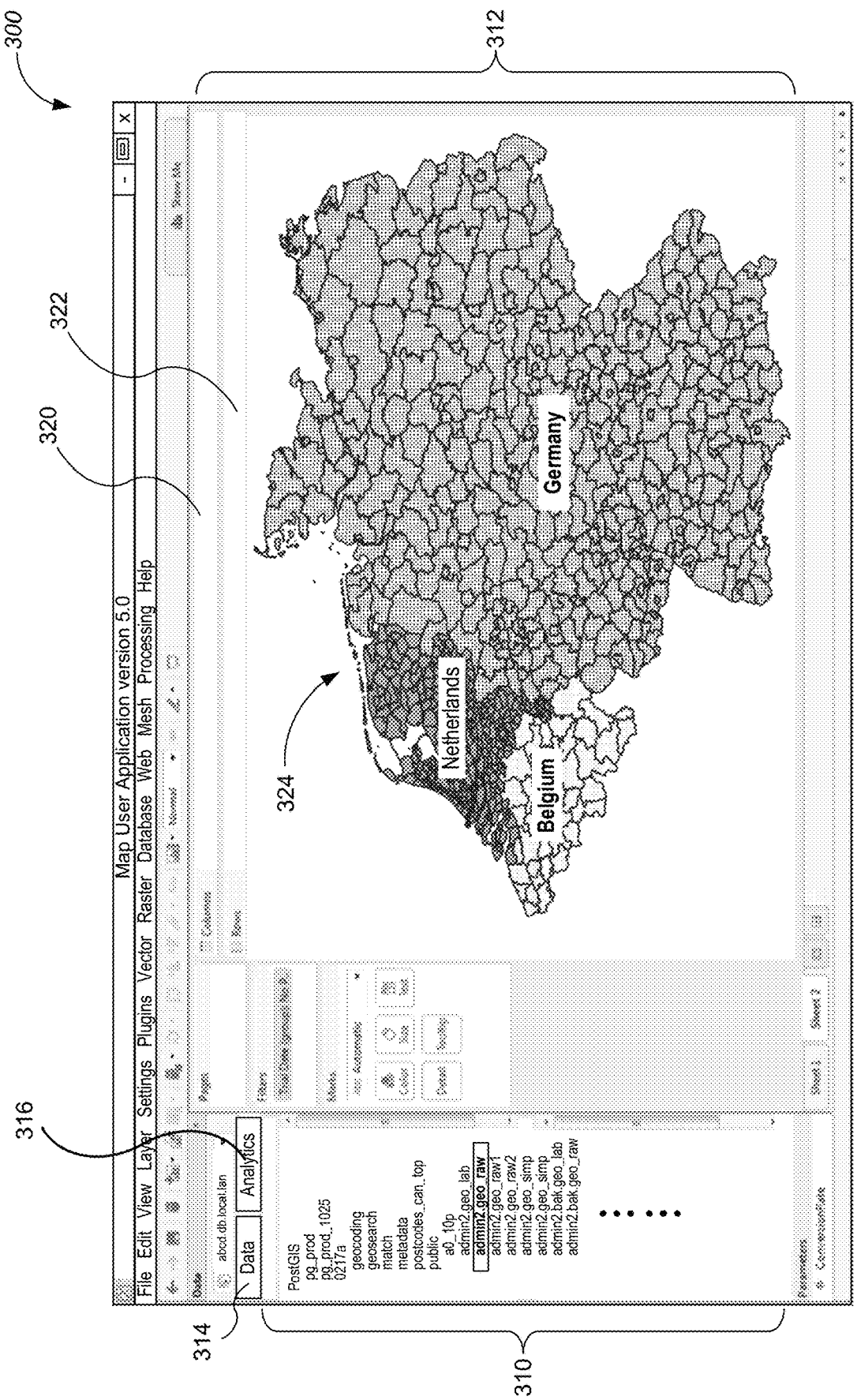
FIG. 3A illustrates a data visualization user interface of a map user application for interactive data visualization, in accordance with some implementations.

FIG. 3A illustrates a data visualization user interface 300 of a map user application 110 for interactive data visualization, in accordance with some implementations. In some implementations, the user interface 300 includes a Data tab 314 and an Analytics tab 316 in accordance with some implementations. When the Data tab 314 is selected, the user interface 300 displays a schema information region 310, which is also referred to as a data pane. The schema information region 310 provides named data elements (e.g., field names) that may be selected and used to build a data visualization. In some implementations, the list of field names is separated into a group of data dimensions (e.g., categorical data) and a group of measures (e.g., numeric quantities). Some implementations also include a list of parameters. When the Analytics tab 316 is selected, the user interface 300 displays a list of analytic functions instead of data elements (not shown). Specifically, in the map user application 110, the schema information region 310 includes predefined or previously accessed geographical regions that are selectable for visualization.

The user interface 300 also includes a data visualization region 312. The data visualization region 312 includes a plurality of shelf regions, such as a columns shelf region 320 and a rows shelf region 322, which determine horizontal and vertical placement of visual marks for a data visualization. These are also referred to as the column shelf 320 and the row shelf 322. In some implementations, the plurality of shelf regions includes three or more shelf regions corresponding to a data space having three or more dimensions. As illustrated here, the data visualization region 312 also has a large space for displaying a visual graphic (e.g., a global map, a regional map). When no data elements have been selected yet, the space initially has no visual graphic or displays a map (e.g., a predefined map). The displayed map could also be a map that was being reviewed when a last visit to the application 110 was terminated. In some implementations, the data visualization region 312 has multiple layers that are referred to as sheets.

In some instances, a scatter chart is displayed in the data visualization region 312, with a y-axis of the scatter chart correspond to a first data field. The y-axis is displayed according to a symmetric logarithmic scale. As a result, a plurality of tick marks are evenly distributed on the positive y-axis to represent different orders of magnitude (e.g., 0.1, 1, 10, 100, and 1000). Also, the negative y-axis represents orders of magnitude for negative values.

Referring to FIG. 3A, in this example, the map user application 110 utilizes a Python UI tool to call PostGIS queries and process map data on a PostgreSQL server. A two-dimensional (2D) map 324 is displayed in the data visualization region 312 to illustrate part of the western European region corresponding to the Netherlands, Belgium, and Germany. Each country is represented by a polygon group including a plurality of respective polygons that have matching edges, and each polygon represents a lower geographical region (e.g., a county or province) in a respective country. In a border region of two countries, a first polygon corresponds to a first geographical region of a first country, and a second polygon corresponds to a second geographical region of a second country and is connected to the first polygon. Edges of the first and second polygons are at least partially mismatched. When the map 324 is displayed on a country level, the resolution of the map 324 is limited, and the partially mismatched edges of two polygons on the border region of any two countries (e.g., Germany and Belgium) are visible. When the map 324 is zoomed in and displayed on a lower level (e.g., on a county level), the resolution of the map 324 is increased, and the partially mismatched edges of two polygons on the border region of any two countries are observed (e.g., in FIG. 3B) and matched using the disclosed geometric operations (e.g., in FIG. 3C).

In some implementations, the map data associated with the map user application 110 includes a plurality of map data items, and each polygon represents a lower geographical region in a country corresponds to a respective data item in a database 122. The respective data item includes a row in the database 122 and has a plurality of data columns (i.e., data fields) including a border indicator. The border indicator indicates whether the respective polygon is located in a border region of two countries and which other polygons the respective polygon borders. In one example, the border indicator includes a flag that specifies whether the respective polygon has an internal polygon defining a region within the interior of a country (e.g., when the flag is "0") or a border polygon defining a region in a border region of a country (e.g., when the flag is "1"). Geometric operations (e.g., union and intersection) are applied to match edges of two polygons in accordance with a determination that the border indicators of the two polygons indicate that the two polygons are in a border region of respective countries (e.g., are not internal to the respective countries).

Figure 3B:
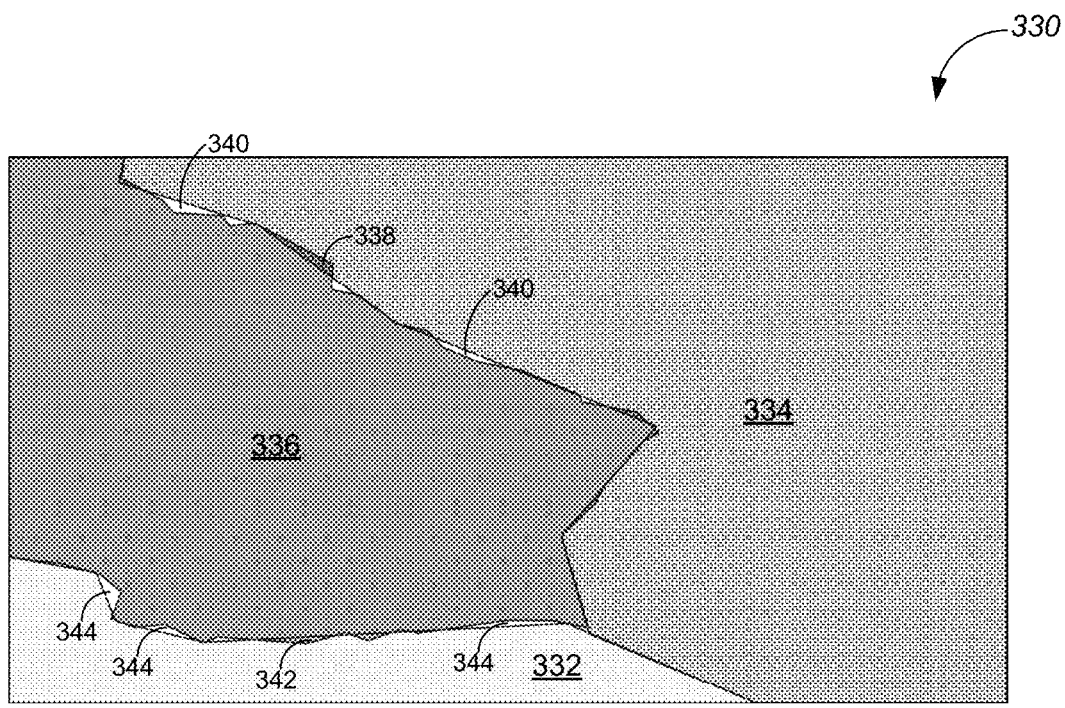
FIG. 3B illustrate a representative border region into which a map is zoomed on a user interface of a map user application, in accordance with some implementations.

FIG. 3B illustrate a representative border region 330 into which a map 324 is zoomed on a user interface of a map user application 110, in accordance with some implementations. The map 324 is zoomed into the border region 330 and displayed on a lower level (e.g., on a county level). The border region 330 includes three regions of three distinct counties, and these three regions are represented by three polygons 332, 334, and 336, which are partially displayed in FIG. 3B. Mathematically, a polygon has a precise meaning: it is a closed sequence of contiguous line segments. In this disclosure, it is sometimes convenient to refer to the region enclosed by a polygon as a "polygon." In general, this is not problematic, because context usually makes it clear whether a sentence is referring to a one-dimensional object (a true polygon) or a two-dimensional region (enclosed by a polygon). For example, the first polygon 332 represents a first region in Belgium, and the second polygon 334 represents a second region in Germany. The third polygon 336 represents a third region in the Netherlands. The three polygons 332, 334, and 336 are connected and immediately adjacent to each other. The resolution of the map 324 displayed on this county level is greater than that of the same map 324 displayed on the country level, and the partially mismatched edges of two polygons on the border region of any two countries can be observed. Specifically, regions of the first and second polygons 332 and 334 may overlap each other; however, they are displayed with matching edges. Regions of the second and third polygons 334 and 336 share overlapping areas 338 while forming a plurality of gaps 340 in between, and therefore, are displayed with mismatched edges. Similarly, regions of the first and third polygons 332 and 336 share overlapping areas 342 while forming a plurality of gaps 344 in between, and therefore, are displayed with mismatched edges.

Figure 3C:
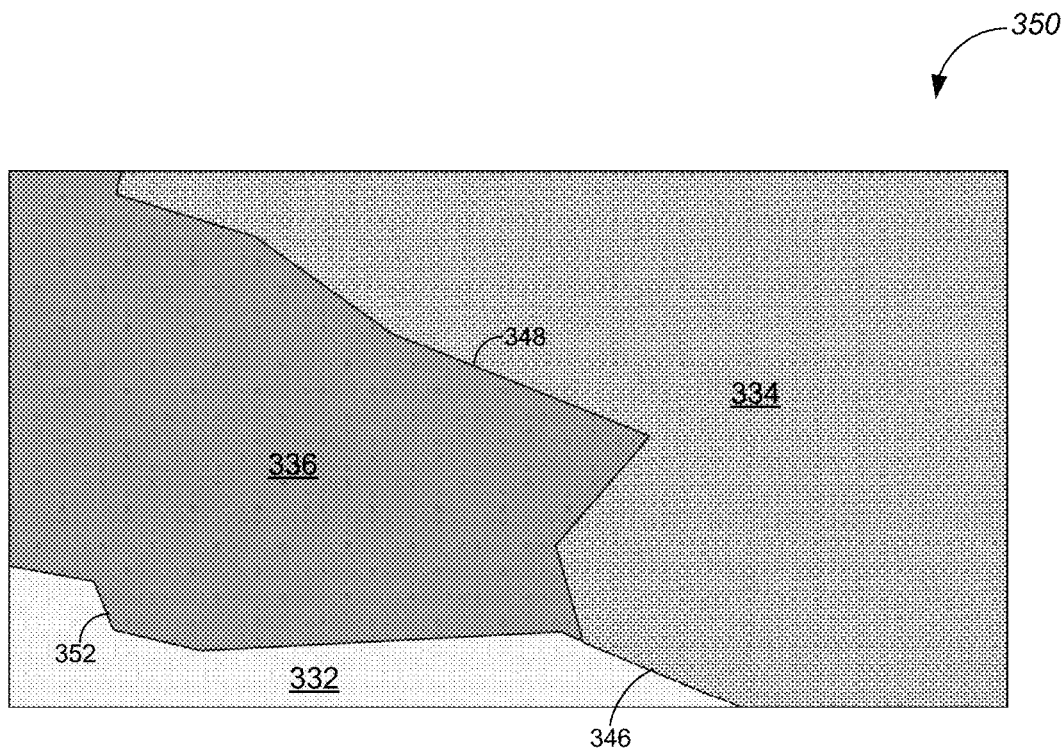
FIG. 3C illustrate another representative border region that has been modified to match edges of neighboring foreign regions, in accordance with some implementations.

FIG. 3C illustrate another representative border region 350 that has been modified to match edges of neighboring foreign regions, in accordance with some implementations. Geometric operations (e.g., union and intersection) are applied to match edges of two connected polygons in the border region 330 in FIG. 3B, automatically and without user intervention. As a result of applying the geometric operations, the overlapping areas 338 and gaps 340 are removed from the border region 330, and so are the overlapping areas 342 and gaps 344. If the regions of the first and second polygons 332 and 334 overlap each other, corresponding overlapping areas shared by the regions are removed from the border region 330. In some implementations, if a user command is received on the user interface 300 to zoom into a map area including the border region 330, at least a subset of the polygons 332, 334, and 336 are updated using geometric operations and rendered as in the border region 350 with matching edges 346, 348, and 352.

Figure 3D:
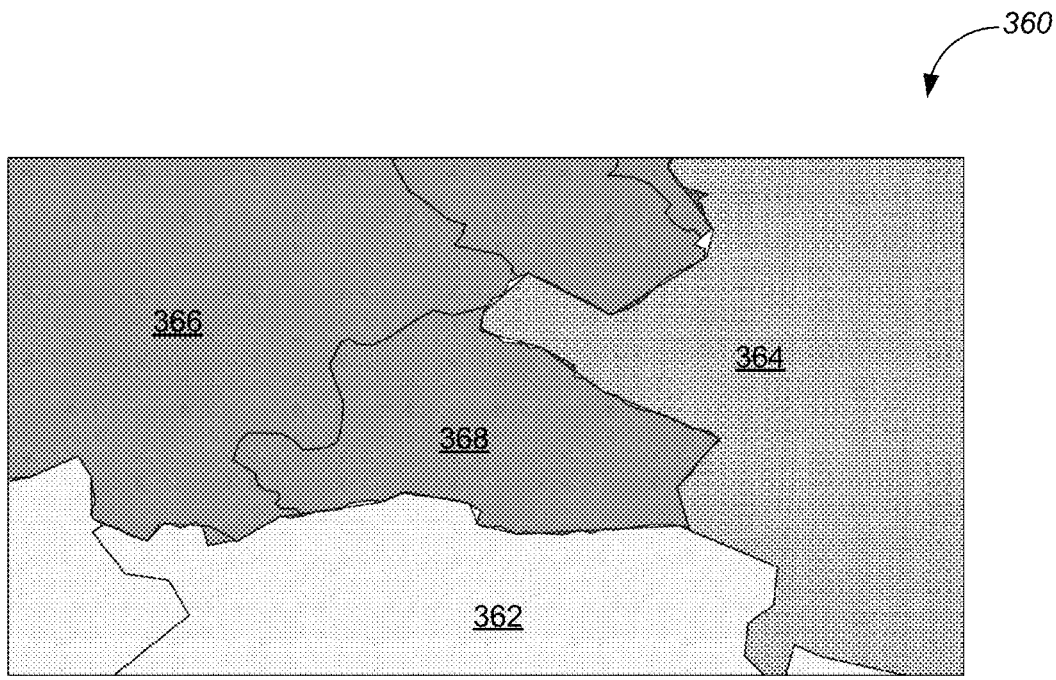
FIGS. 3D and 3E illustrate another representative region into which the map is zoomed on a user interface of a map user application, in accordance with some implementations.
Figure 3E:
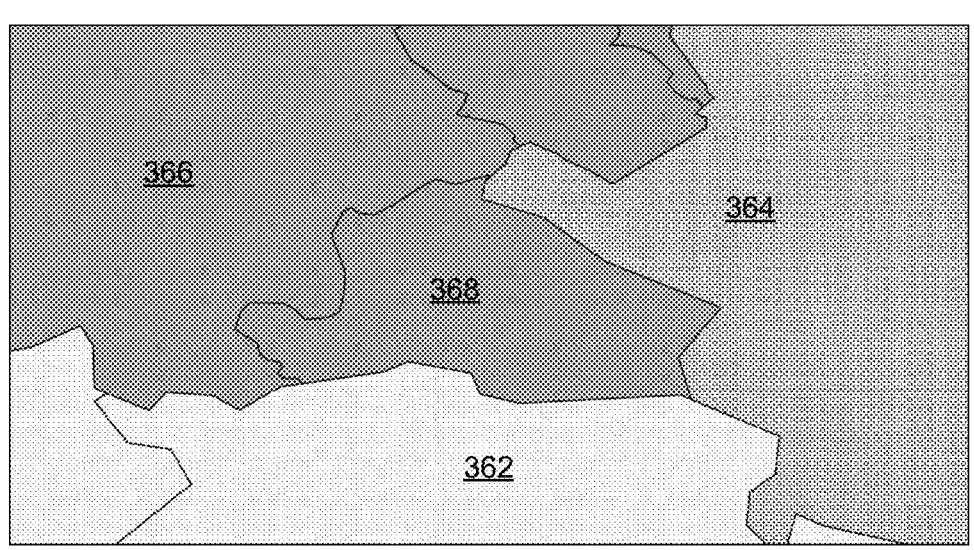

FIGS. 3D and 3E illustrate another representative region 360 into which the map 324 is zoomed on a user interface of a map user application 110, in accordance with some implementations. The map 324 is zoomed into the border region 360 and displayed on a lower level (e.g., on a county level). The border region 360 includes four regions of three distinct countries, and these four regions are represented by the four polygons 362, 364, 366, and 368, which are partially displayed in FIG. 3D. Vaals, a town in the Netherlands, is represented by the fourth polygon 368, which is connected to the other three polygons 362, 364, and 366 representing three neighboring regions in Belgium, Germany, and the Netherlands, respectively. Regions defined by the third and fourth polygons 366 and 368 are both located in the Netherlands and have matching edges. Conversely, edges between the fourth polygon 368 and either of the polygons 362 and 364 are partially mismatched, because the region defined by the fourth polygon 368 is located in the Netherlands while regions defined by the polygons 362 and 364 are not located in the Netherlands. Additionally, regions defined by the polygons 362 and 364 may overlap each other with matching edges. Regions defined by the polygons 364 and 366 share overlapping areas while forming a plurality of gaps in between, so do regions of the polygons 362 and 366.

Referring to FIG. 3E, the border region 360 is modified to match edges of neighboring foreign regions defined by the polygons 362-368. Geometric operations (e.g., union and intersection) are applied to match edges of two connected polygons in the border region 330, automatically and without user intervention. As a result of applying the geometric operations, the overlapping areas and gaps among the regions defined by the polygons 362-368 are removed from the border region 360. The polygons 362-368 are displayed on the data visualization region 312 of the user interface 300 with matching edges. The matching edges of any two connected polygon overlap each other, and do not intersect with each other or create a hole or gap thereamong.

Figure 4A:
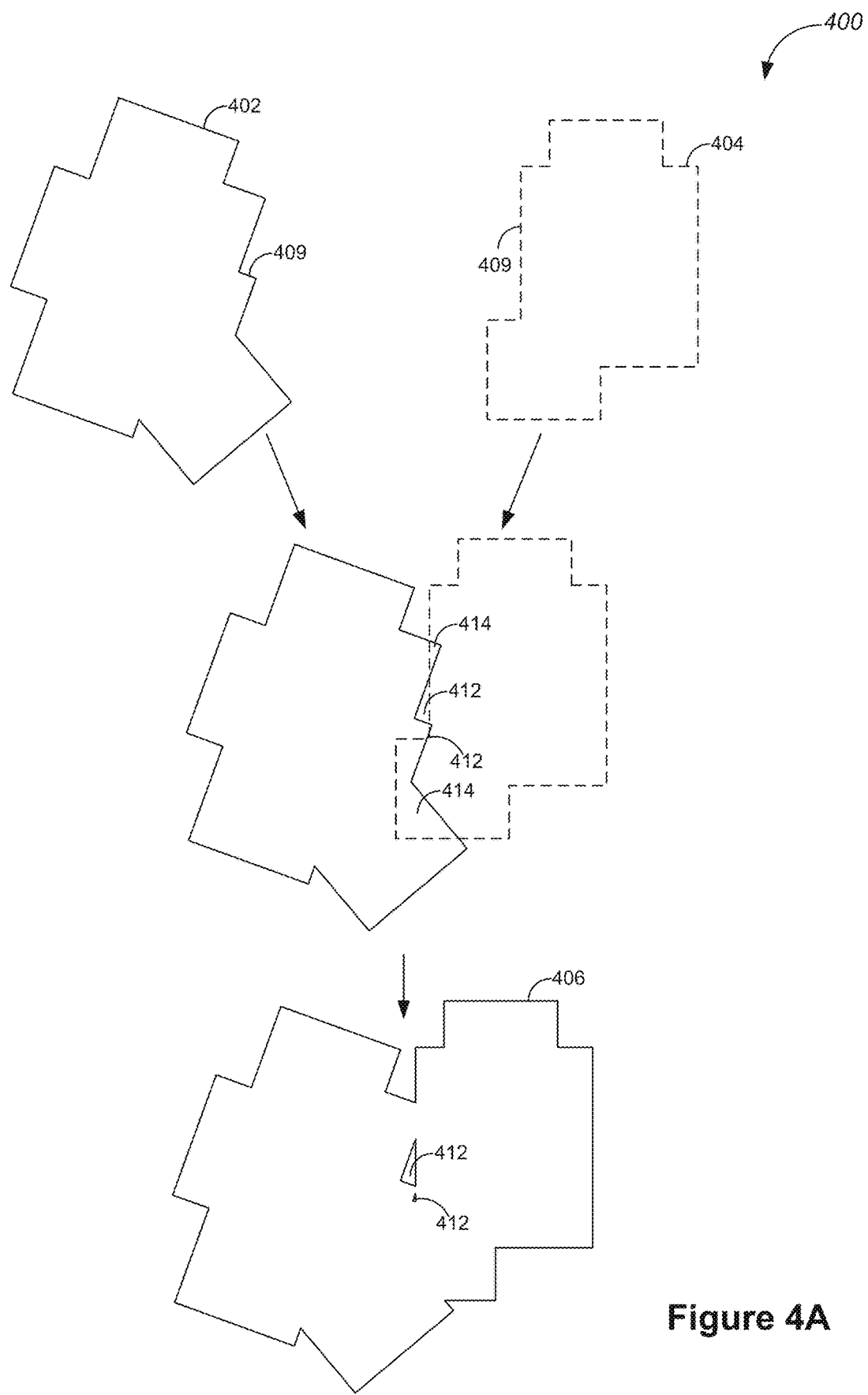
FIG. 4A illustrates a representative polygon joining process in which two polygons are combined to a joined polygon, in accordance with some implementations.
Figure 4B:
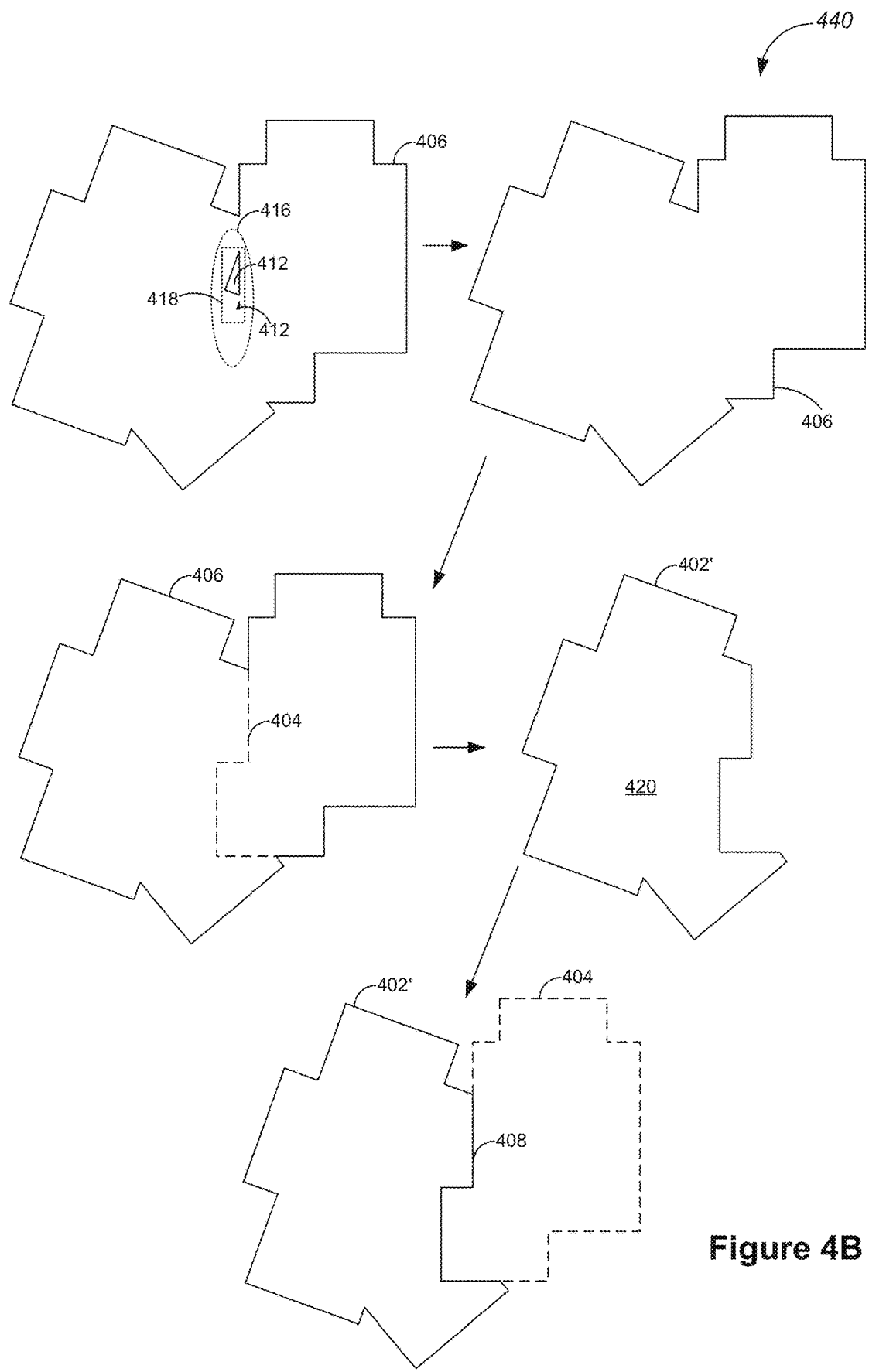
FIG. 4B illustrates a representative forward edge matching process in which two polygons are regenerated with first matching edges from a joined polygon, in accordance with some implementations.

FIG. 4A illustrates a representative polygon joining process 400 in which two polygons 402 and 404 are combined to a joined polygon 406, in accordance with some implementations, and FIG. 4B illustrates a representative forward edge matching process 440 in which two polygons 402' and 404 are regenerated with first matching edges 408 from a joined polygon 406, in accordance with some implementations. In a map user application 110, a first polygon 402 corresponds to a first geographical region of a first country, and a second polygon 404 corresponds to a second geographical region of a second country. The second geographical region is neighboring and immediately adjacent to the first geographical region. The second polygon 404 is connected to the first polygon 402 via polygon edges 409 that are at least partially mismatched. Stated another way, the first and second polygons 402 and 404 intersect with each other at the polygon edges 409. Two regions defined by the first and second polygons 402 and 404 are connected to each other via the polygon edges 409 in the map 324, forming one or more holes 412, one or more overlapping areas 414, or both between the two regions. Referring to FIG. 4A, in this example, the first and second polygons 402 and 404 are connected to each other, such that the two regions defined by the first and second polygons 402 and 404 form two holes 412 and two overlapping areas 414.

As the first and second polygons 402 and 404 are connected to each other, the first polygon 402 and the second polygon 404 are combined to form the joined polygon 406 defined by an outline of the first polygon 402 and the second polygon 404. A first union operation is thereby applied to combine regions defined by the first and second polygon 402 and 404. The two overlapping areas 414 disappear and merge into a region defined by the joined polygon 406, while the two holes 410 still exist and are enclosed by the joined polygon 406. Referring to FIG. 4B, in some implementations, the joined polygon 406 encloses a first edge merging region 416 where the second polygon 404 is connected to the first polygon 402. The first edge merging region 416 includes the two holes 410. The holes 410 are removed from the first edge merging region 416 of the joined polygon 406. Specifically, in an example, an edge polygon 418 is created to enclose the holes 410, and a second union operation is applied to merge regions defined by the edge polygon 418 and the joined polygon 406, thereby eliminating the holes 410 enclosed by the joined polygon 406.

In a following intersection or subtraction operation, a region defined by the second polygon 404 is subtracted from a region defined by the joined polygon 406 to form a first new region 420. An outline of the first new region 420 defines an updated first polygon 402'. The updated first polygon 402' and the second polygon 404 have first matching edges 408 (i.e., a border 408). The updated first polygon 402' and the second polygon 404 are rendered with the first matching edges 408 on a screen. For example, the map user application 110 is executed on an electronic device to display the updated first polygon 402' and the second polygon 404 with the first matching edges 408 on the data visualization region 312 of the corresponding user interface 300.

In some implementations not shown in FIGS. 4A and 4B, when the two regions defined by the first and second polygons 402 and 404 are connected, these two regions share one or more overlapping areas 414 without forming any hole 412 between the two regions in the first edge merging region 416. That said, the first polygon 402 and the second polygon 404 are combined to the joined polygon 406 that does not enclose any holes 412, and no hole removing operation is implemented. The region defined by the second polygon 404 is subtracted from the region defined by the joined polygon 406 to form the first new region 420. The updated first polygon 402' is defined as an outline of the first new region 420 and rendered, on the screen, jointly with the second polygon 404 sharing the first matching edges 408 with the updated first polygon 402'.

Further, in some implementations, the updated first polygon 402' is rendered on the screen in place of the first polygon 402 in accordance with a determination that the updated first polygon 402' satisfies an edge matching validity criterion. Conversely, in some implementations, while the updated first polygon 402' is rendered on the screen in place of the first polygon 402, an alert is created in accordance with a determination that the updated first polygon 402' does not satisfy the edge matching validity criterion. The updated first polygon 402' incorporates both the holes 412 and overlapping areas 414 in the first edge merging region 416, which potentially causes an excessive area variation of which the user is notified. For this reason, in an example, the edge matching validity criterion requires that an area variation from the first polygon 402 to the updated first polygon 402' is less than a variation threshold. The first polygon 402 encloses a first region having a first area and the updated first polygon 402' encloses a second region having a second area. An area variation is determined between the first area and the second area. If the area variation does not exceed a variation threshold (e.g., 1% of the first area), the updated first polygon 402' is rendered on the screen. Conversely, if the area variation exceeds a variation threshold, a user is alerted of an inaccurate edge calculation for the updated first polygon 402', while the updated first polygon 402' is optionally rendered on the screen in place of the first polygon 402.

Figure 4C:
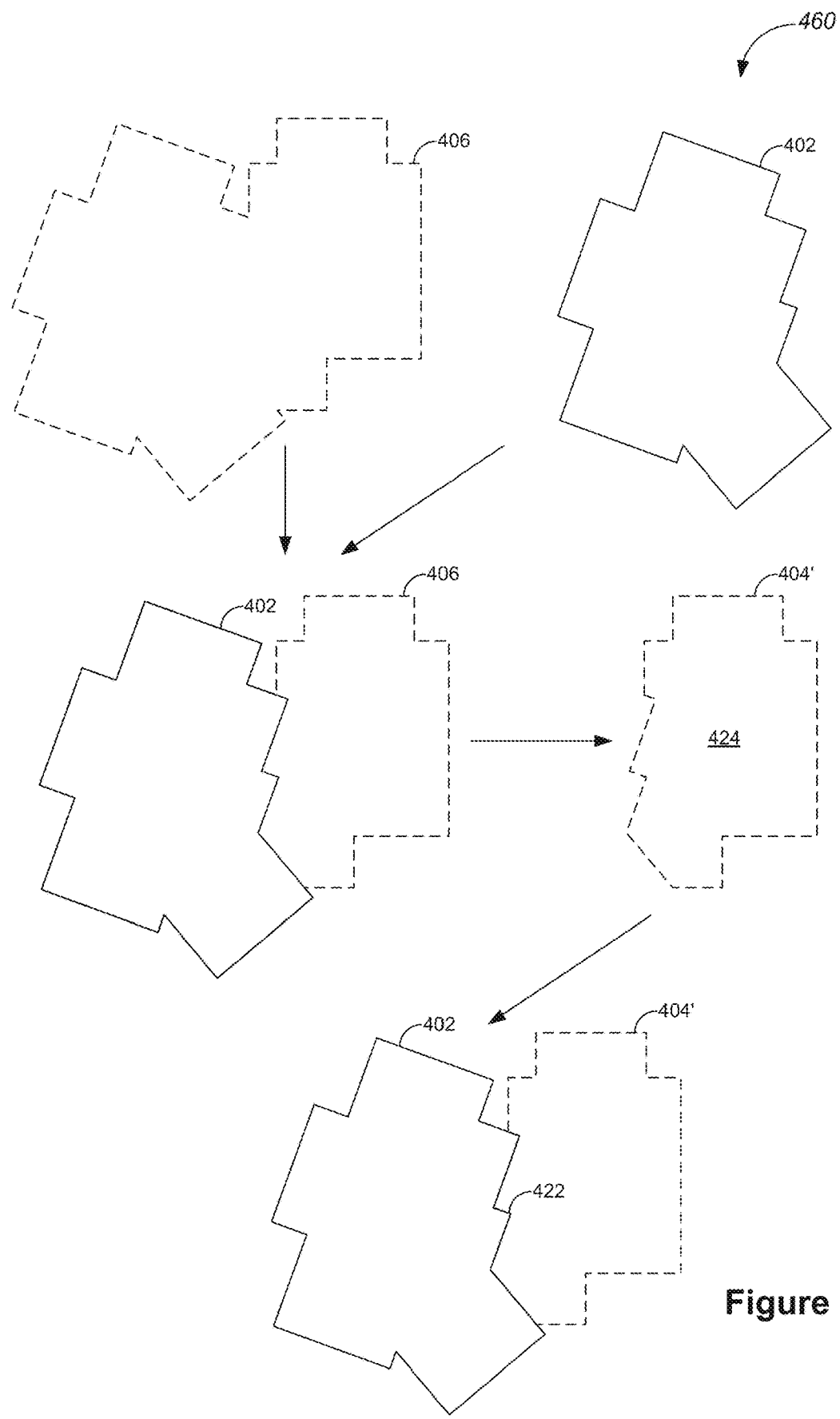
FIG. 4C illustrates another representative reverse edge matching process in which two polygons are regenerated with second matching edges from the joined polygon, in accordance with some implementations.

FIG. 4C illustrates another representative reverse edge matching process 460 in which two polygons 402 and 404 are regenerated with second matching edges 422 from the joined polygon 406, in accordance with some implementations. The same two polygons 402 and 404 in FIG. 4A are combined to form the joined polygon 406 defined by the outline of the first polygon 402 and the second polygon 404. If the joined polygon 406 encloses the holes 412, the holes are removed in the first edge merging region 416 enclosed by the joined polygon 406. A region defined by the first polygon 402 is subtracted from a region defined by the joined polygon 406 to form a second new region 424. An updated second polygon 404' is defined as an outline of the second new region 424. The first polygon 402 and the updated second polygon 404' are rendered, on the screen, with the second matching edges 422.

In some implementations, the second polygon 404 encloses a region having a third area and the updated second polygon 404' encloses a region having a fourth area. An area variation associated with the second polygon 404 is determined between the third area and the fourth area. In some implementations, if the area variation does not exceed a variation threshold (e.g., 1% of the third area), the updated second polygon 404' is rendered on the screen. Conversely, if the area variation exceeds the variation threshold, a user is alerted of an inaccurate edge calculation for the updated second polygon 404', while the updated first polygon 402' is optionally rendered on the screen in place of the second polygon 404 and with the first polygon 402.

In some implementations, either the second polygon 404 or the first polygon 402 can be subtracted from the joined polygon 406 to generate a corresponding updated polygon 402' or 404' and a matching edge 408 or 422, respectively. The updated polygons 402' and 404' incorporate the holes 412 and overlapping areas 414, which potentially causes an excessive area variation of which the user is notified. In some situation, an edge matching process leading to a smaller area variation is selected between the forward edge matching process 440 and reverse edge matching process 460, and a subtraction operation leading to the smaller area variation is selected between the corresponding subtraction options. For example, if the region defined by the updated first polygon 402' has a greater area variation, e.g., in percentage, than the region defined by the updated second polygon 404', the updated second polygon 404' is selected for display with the first polygon 402. Conversely, if the region defined by the updated second polygon 404' has a greater area variation, e.g., in percentage, than the region defined by the updated first polygon 402', the updated first polygon 402' is selected for display with the second polygon 404.

Figure 5A:
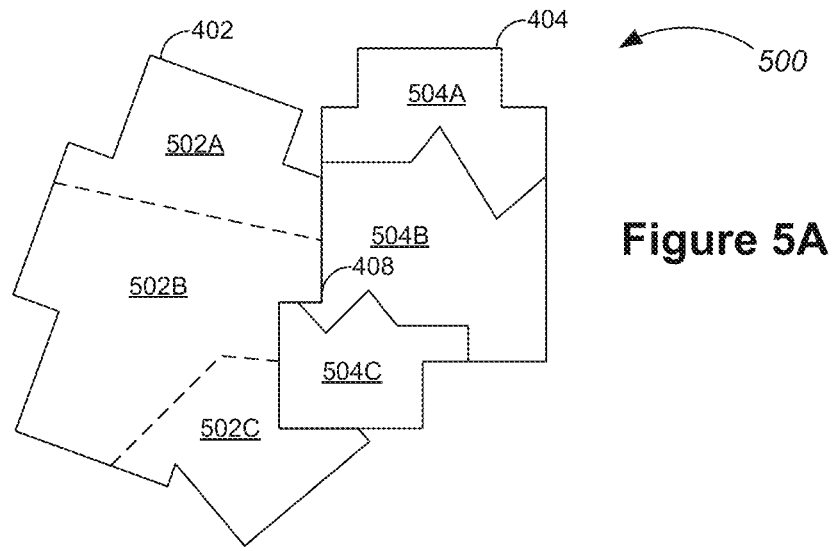
FIG. 5A illustrates a representative map area having two polygons at least one of which encloses a plurality of non-overlapping polygonal regions, in accordance with some implementations.

FIG. 5A illustrates a representative map area 500 having two polygons at least one of which encloses a plurality of non-overlapping polygonal regions, in accordance with some implementations. Geometric operations (e.g., union and intersection) are applied to match edges of two connected polygons, allowing a first polygon 402 and a second polygon 404 to be rendered with matching edges 408 or 422. In a map user application 110, the first polygon 402 represents a first geographical region of a first country, and the second polygon 404 represents a second geographical region of a second country distinct from the first country. The second geographical region is neighboring and immediately adjacent to the first geographical region. In some implementations, the first polygon 402 includes a plurality of polygonal areas 502A-502C that represent a plurality of geographical sub-regions within the first geographical region of the first country. The plurality of polygonal areas 502A-502C are connected to each other via matching edges. In some implementations, the second polygon 404 includes a plurality of polygonal areas 504A-504C that represent a plurality of geographical sub-regions within the second geographical region of the second country. The plurality of polygonal areas 504A-504C are connected to each other via matching edges. Additionally, in some implementations, each and every of the first and second polygons 402 and 404 includes a plurality of respective polygonal areas that are connected to each other via matching edges within a respective polygon.

In some situations, the first geographical region defined by the first polygon 402 includes a single indivisible county of the first country, and each of the plurality of polygonal areas 504A-504C includes a distinct county of the second country. These three distinct counties of the second country are the only counties to which the county of the first country is connected in the second country. In some implementations, edges of the plurality of polygonal areas 504A-504C are matched to edges of the first polygon 402 individually and separately. Alternatively, in some implementations, the plurality of polygonal areas 504A-504C are grouped to the second polygon 404, and edges of the second polygon 404 are matched to the edges of the first polygon 402 via a single sequence of geometric operations (e.g., a union operation followed by an intersection operation in an edge matching process 440 or 460).

In some situations, the first geographical region defined by the first polygon 402 includes a plurality of counties of the first country. Each of the plurality of polygonal areas 502A-502C includes a distinct county of the first country, and each of the plurality of polygonal areas 504A-504C includes a distinct county of the second country. The first country and the second country are connected to each other via multiple geographical sub-regions on both sides of a border 408. In some implementations, edges of each polygonal area 504A-504C are matched to edges of the individual polygonal areas 504A-504C individually and separately. Alternatively, in some implementations, the plurality of polygonal areas 504A-504C are grouped to the second polygon 404, and edges of the second polygon 404 are matched to the edges of each polygonal area 502A, 502B, or 502C separately. Alternatively and additionally, in some implementations, the plurality of polygonal areas 504A-504C are grouped to the second polygon 404, and the plurality of polygonal areas 502A-502C are grouped to the first polygon 402. The edges of the second polygon 404 are matched to the edges of the first polygon 402 via a single sequence of geometric operations (e.g., a union operation followed by an intersection operation in an edge matching process 440 or 460).

Figure 5B:
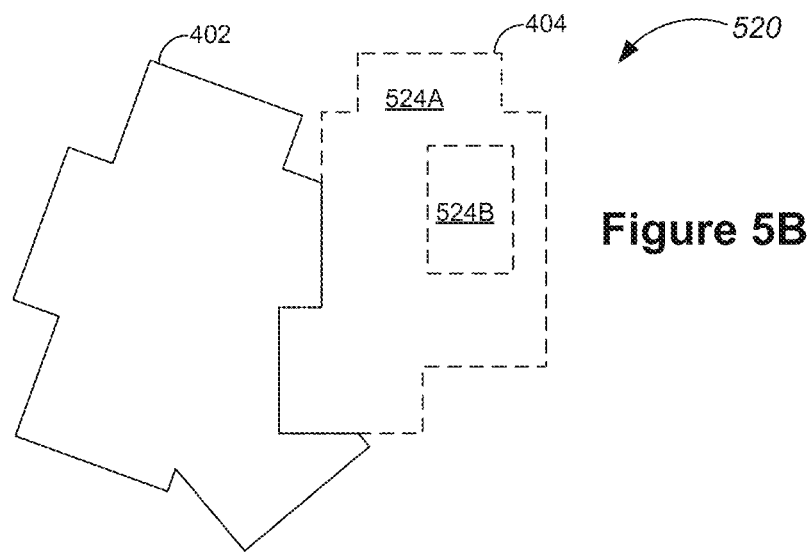
FIGS. 5B and 5C illustrate two representative map areas each having two polygons at least one of which encloses a plurality of non-overlapping polygonal regions, in accordance with some implementations.
Figure 5C:
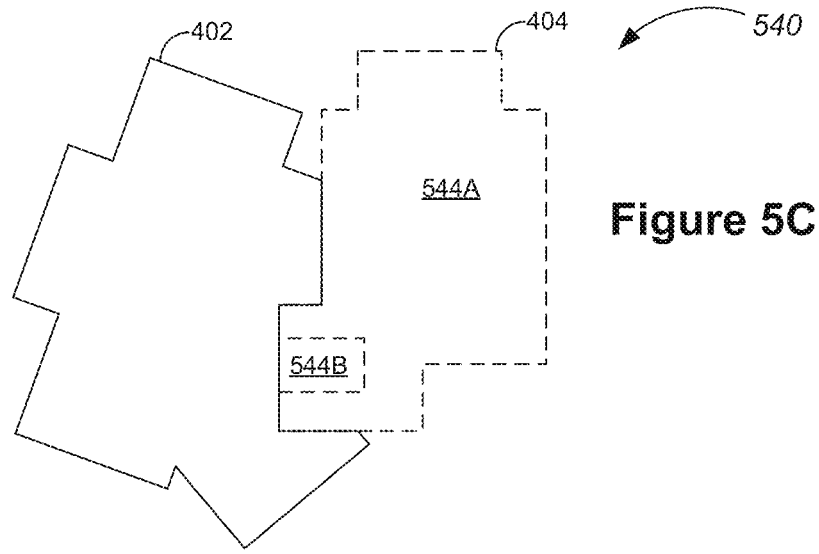

FIGS. 5B and 5C illustrate two representative map areas 520 and 540 each having two polygons at least one of which encloses a plurality of non-overlapping polygonal regions, in accordance with some implementations. Referring to FIG. 5B, the second polygon 404 includes a plurality of polygonal areas 524A and 524B that represent a plurality of geographical sub-regions. A first polygonal area 524A encloses a second polygonal area 504B and are connected to each other via matching edges within the region defined by the second polygon 404. Referring to 5C, the second polygon 404 includes a plurality of polygonal areas 544A and 544B that represent a plurality of geographical sub-regions. A first polygonal area 544A encloses a second polygonal area 544B from three edges, and are connected to each other via matching edges within the region defined by the second polygon 404. A remaining edge of the second polygonal area 544B is connected to the region defined by the first polygon 402. Preferably, in some implementations, the plurality of polygonal areas 524A and 524B or the plurality of polygonal areas 544A and 544B are grouped to a respective region defined by the second polygon 404, and edges of the respective second polygon 404 are matched to the edges of the first polygon 402 via a single sequence of geometric operations (e.g., a union operation followed by an intersection operation).

Figure 5D:
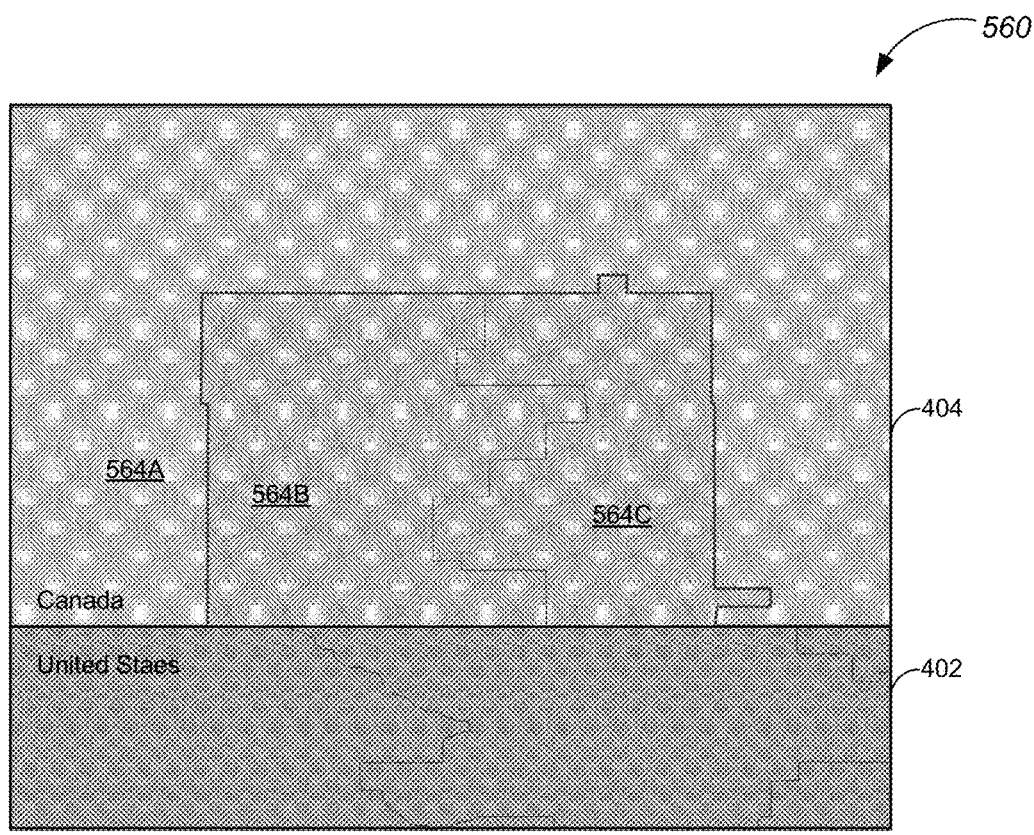
FIGS. 5D and 5E illustrate two representative map areas each having two polygons at least one of which encloses a plurality of non-overlapping polygonal regions, in accordance with some implementations.
Figure 5E:
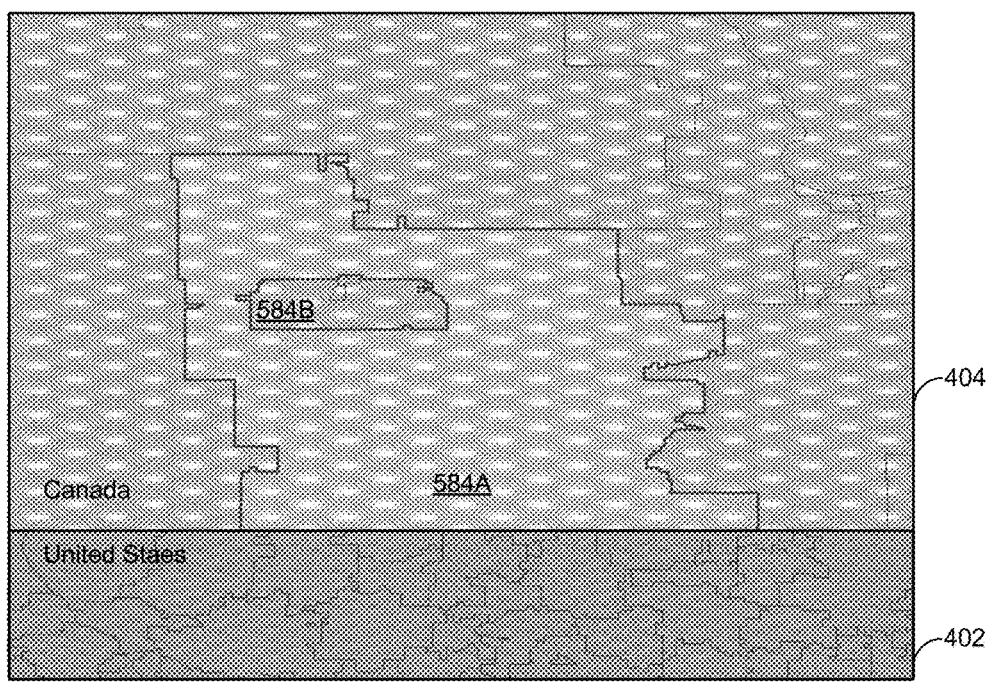

FIGS. 5D and 5E illustrate two representative map areas 560 and 580 each having two polygons at least one of which encloses a plurality of non-overlapping polygonal regions, in accordance with some implementations. The map areas 560 and 580 are cropped from a postal code map, and each of them includes a border between Canada and the United States along the 49th parallel north. Referring to FIG. 5D, a first polygon 402 defines a geographical region in the United States, and a second polygon 404 encloses three polygonal areas 564A, 564B, and 564C that border the U.S. and represent Canadian postal codes ROG, R6M, and R6W, respectively. The first polygonal area 564A is connected to the region defined by the first polygon 402 from two sides of the second and third polygonal areas 564B and 564C. In some implementations, the three polygonal areas 564A-564C are joined to form the region defined by the second polygon 404, and edges of the second polygon 404 are matched to edges of the first polygon 402 via a sequence of geometric operations (e.g., a union operation followed by an intersection operation).

Referring to FIG. 5E, a first polygon 402 defines a geographical region in the United States, and a second polygon 404 encloses two polygonal areas 584A and 584B that represent two distinct Canadian postal codes and have matching edges. A first polygonal area 584A is connected to the region defined by the first polygon 402, and fully encloses the second polygonal area 584B that does not border the United States. In some implementations, the second polygonal areas 584A and 584B are joined to the second polygon 404, and edges of the second polygon 404 are matched to edges of the first polygon 402 via a sequence of geometric operations (e.g., a union operation followed by an intersection operation).

Figure 6:
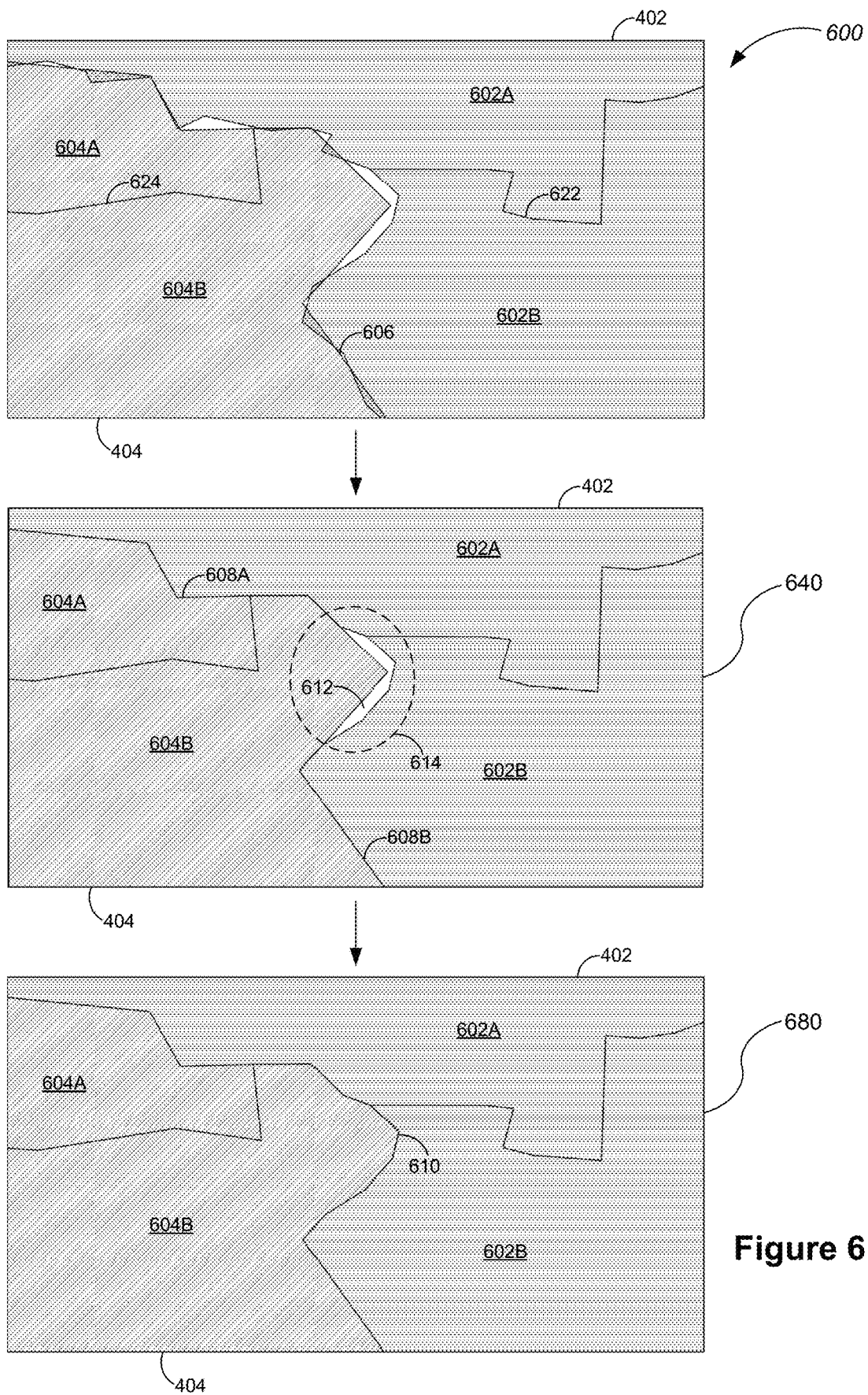
FIG. 6 illustrates a representative edge matching process including both forward edge matching and reverse edge matching, in accordance with some implementations.

FIG. 6 illustrates a representative edge matching process 600 including both forward edge matching 640 and reverse edge matching 660, in accordance with some implementations. The edge matching process 600 is applied to match edges of two connected polygons 402 and 404, allowing a first polygon 402 and a second polygon to be rendered with matching edges 610. In a map user application 110, the first polygon 402 represents a first geographical region of a first country, and the second polygon representing a second geographical region of a second country distinct from the first country. The second geographical region is neighboring and immediately adjacent to the first geographical region. The first polygon 402 encloses two first non-overlapping polygonal areas 602A and 602B that represent two geographical sub-regions of the first geographical region. The first polygonal areas 602A and 602B are connected to each other via first internal edges 622 that match each other within the first geographical region of the first country. The second polygon 404 encloses two second non-overlapping polygonal areas 604A and 604B that represent two geographical sub-regions of the second geographical region.

The two second polygonal areas 604A and 604B are connected to each other via second internal edges 624 that match each other within the second geographical region of the second country.

The first geographical region of the first country is connected to the second geographical region of the second country via mismatched polygon edges 606 of the first and second polygons 402 and 404. The first polygonal area 602A is connected to the second polygonal areas 604A and 604B via mismatched edges, so is the first polygonal area 602B connected to the second polygonal area 604B.

During forward edge matching 640, a respective polygon defining each first polygonal area 602A or 602B is combined with the second polygon 404 to form a respective joined polygon defined by a respective outline of the respective polygon and second polygon 404. One or more holes, if exist, are removed from an edge merging region defined by the respective joined polygon. The region defined by the second polygon 404 is subtracted from the region defined by the respective joined polygon to form a respective new region. For each first polygonal area 602A or 602B, an updated respective polygon is defined as an outline of the respective new region and rendered with the second polygon 404 with matching edges 608A or 608B, respectively. As a result of forward edge matching, a gap 612 forms in an edge merging region 614 where the first polygonal areas 602 and 602B and the second polygonal area 604B meet. In accordance with a determination that the gap 612 is formed between the first and second polygons 402 and 404, reverse edge merging is applied to eliminate the gap 612.

During reverse edge matching 660, a respective polygon defining each second polygonal area 604A or 604B is combined with the first polygon 402 to form a respective joined polygon defined by a respective outline of the respective polygon and first polygon 402. One or more holes, if exist, are removed from an edge merging region defined by the respective joined polygon. The region defined by the first polygon 402 is subtracted from the region defined by the respective joined polygon to form a respective new region. For each second polygonal area 604A or 604B, an updated respective polygon is defined as an outline of the respective new region and rendered with the first polygon 402 with matching edges 610. Alternatively, in some implementations, reverse edge matching is only applied to polygons enclosing a subset of the second polygonal areas 604, each of which is immediately adjacent to the gap 612. In this example, the subset of the second polygonal areas 604 immediately adjacent to the gap 612 only includes the second polygonal area 604B. The above reverse edge matching operations are applied only on a polygon defining the second polygonal area 604 and the first polygon 402.

Alternatively and additionally, in some implementations, reverse edge matching 660 is applied once to the second polygon 404 that defines the second polygonal areas 604A and 604B. The second polygon 404 is combined with the first polygon 402 to form a joined polygon defined by an outline of the second polygon 404 and first polygon 402. The gap 612 is removed from a region defined by the joined polygon. The region defined by the first polygon 402 is subtracted from the region defined by the joined polygon to form a new region. An updated second polygon 404 is defined as an outline of the new region and rendered with the first polygon 402 with matching edges 610.

Figure 7:
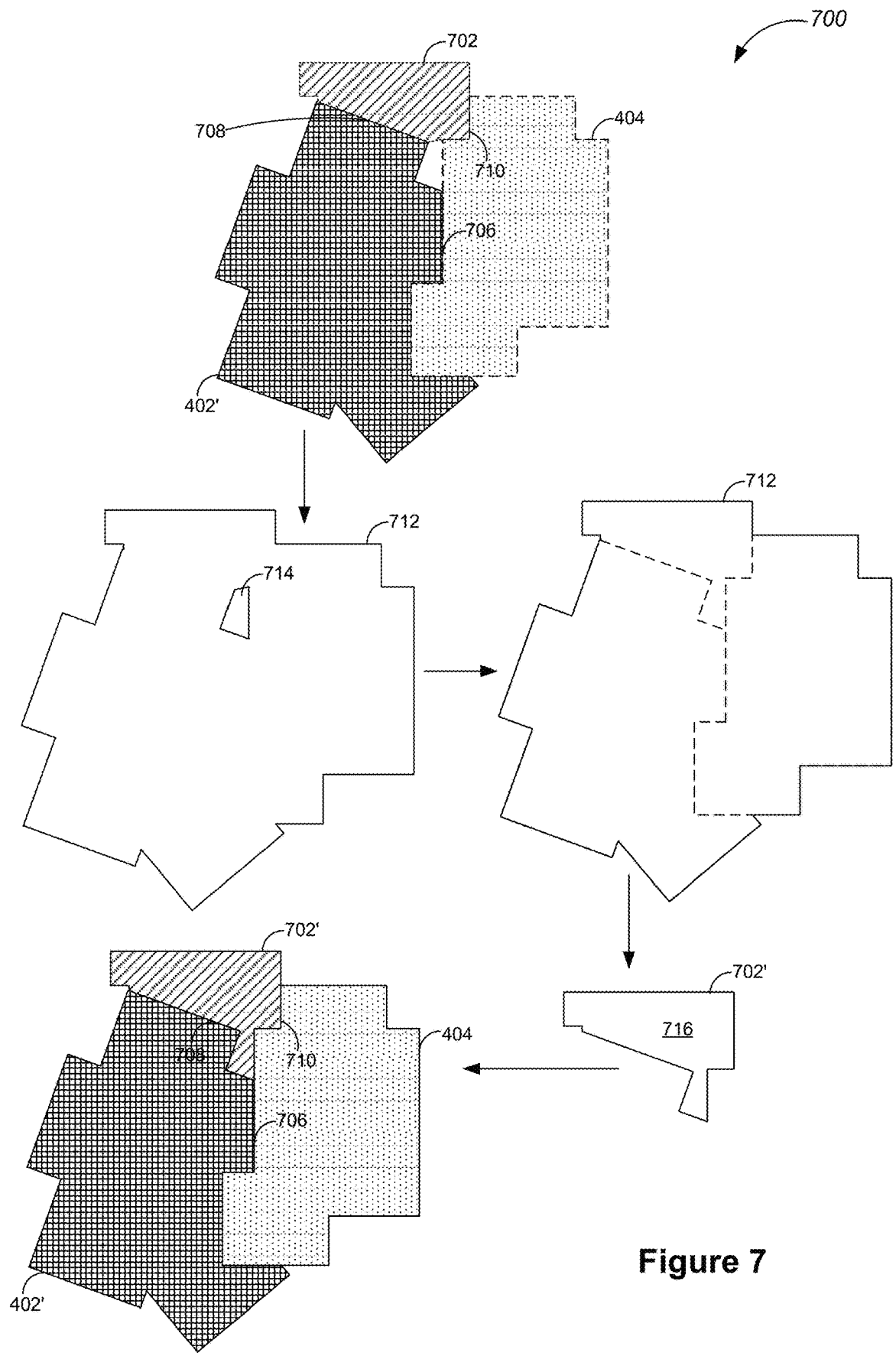
FIG. 7 illustrates a representative edge matching process in which edges of three polygons defining three countries are modified and matched in a border region where the three polygons are connected to each other, in accordance with some implementations.

FIG. 7 illustrates a representative edge matching process 700 in which edges of three polygons 402, 404, and 702 defining three countries are modified and matched in a border region where the three polygons 402, 404, and 702 are connected to each other, in accordance with some implementations. In a map user application 110, a first polygon 402 defines a first geographical region of a first country, and a second polygon 404 corresponds to a second geographical region of a second country. A third polygon 702 corresponds to a third geographical region of a third country. The second geographical region is neighboring to both of the first geographical region and the third geographical region, while the first and third geographical regions are also neighboring to each other. Originally, every two of the first, second, and third polygons are connected via respective polygon edges that are at least partially mismatched.

In some implementations, geometric operations (e.g., union and intersection) are applied to match edges of at least the polygons 402 and 404. For example, the polygons 402 and 404 are processed by the polygon joining process 400 and edge matching process 440 or 480 to form matching edges 706. As a result, an updated first polygon 402' and the second polygon 404 are connected with the matching edges 706, and the third polygon 702 is connected to the first polygon 402' and second polygon 404 via edges 708 and 710, respectively. The edges 708 and 710 are matched or unmatched depending on whether geometric operations have been applied to match edges of the third polygon 702 with each of the polygons 402' and 404. Further, in some implementations, geometric operations are applied to match edges of every two of the three polygons 402, 404, and 702. As a result, the first polygon 402' and second polygon 404 are connected with the matching edges 706, and the third polygon 702 is connected to the first polygon 402' and second polygon 404 via the matching edges 708 and 710, respectively.

In some situations, a hole 714 is formed among the three polygons 402', 404, and 702 after mismatched edges between every two polygons are matched. Geometric operations (e.g., union and intersection) are automatically applied to remove the hole 714. The first polygon 402', second polygon 404, and third polygon 702 are combined to form a second joined polygon 712 defined by an outline of the first polygon 402', second polygon 404, and third polygon 702. At a second edge merging region, the third polygon 702 is connected to the first or second polygon 402' or 404. If edges of the third polygon 702 are not previously matched with edges of the first or second polygon 402' or 404, the second edge merging region optionally includes one or more second holes or one or more second overlaps. The second holes or overlaps, if exist, are formed by the edges 708 or 710. The one or more second holes are removed in the second edge merging region of the second joined region. In some implementations, the one or more second holes include the hole 714. In some implementations, the one or more second holes do not include the hole 714.

In some implementations, regions defined by the updated first polygon 402' and second polygon 404 are subtracted from a region defined by the second joined polygon 712 to form a new region 716. Optionally, the polygons 402' and 404 are joined to a first joined polygon 406, and a region defined by the first joined polygon 406 is subtracted from the region defined by the second joined polygon 712. Optionally, the regions defined by the polygons 402' and 404 are successively subtracted from the region defined by the second joined polygon 712. An updated third polygon 702' is defined as an outline of the new region 716. The third polygon 702' is expanded to enclose the hole 714, so are the matching edges 708 and 710 extended. The first polygon 402', second polygon 404, and updated third polygon 702' are rendered, on a screen, with the matching edges 706-710.

Alternatively, in some implementations, one or more alternative subtraction operations (also called intersection operations) are applied to update the first polygon 402' or second polygon 404, and a region defined by the first polygon 402' or second polygon 404 is expanded to enclose the hole 714.

Figure 8A:
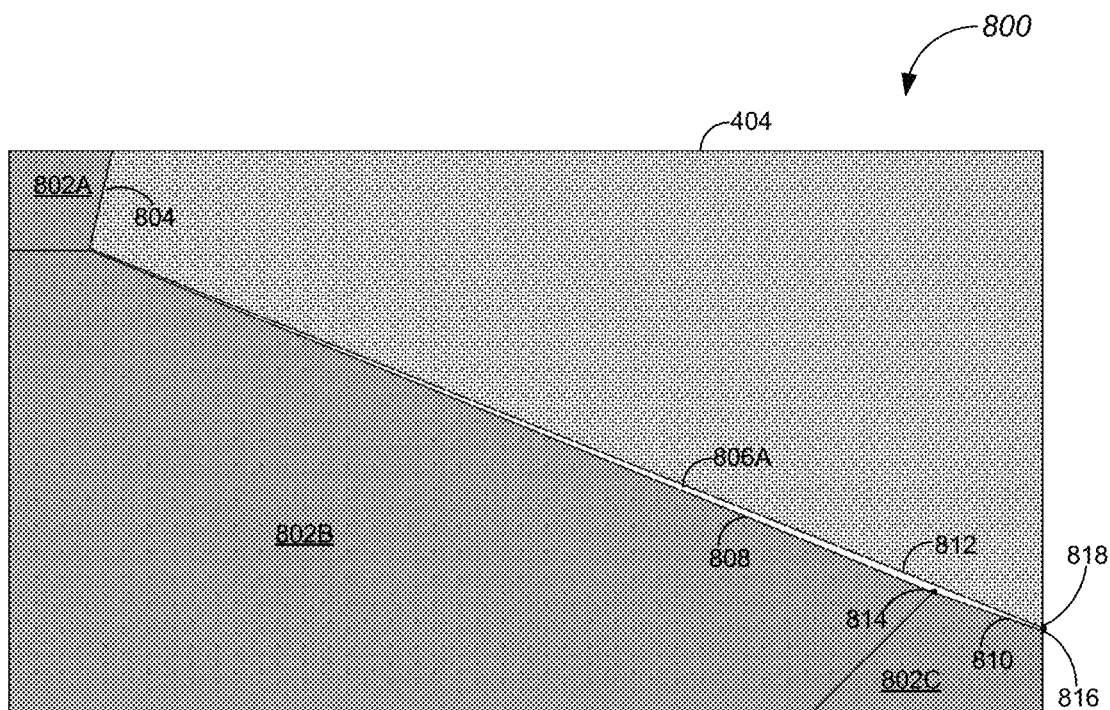
FIGS. 8A and 8B illustrate two representative map areas having remaining gaps 806 that are formed between edges of two neighboring polygons and not filled by geometric operations, in accordance with some implementations.
Figure 8B:
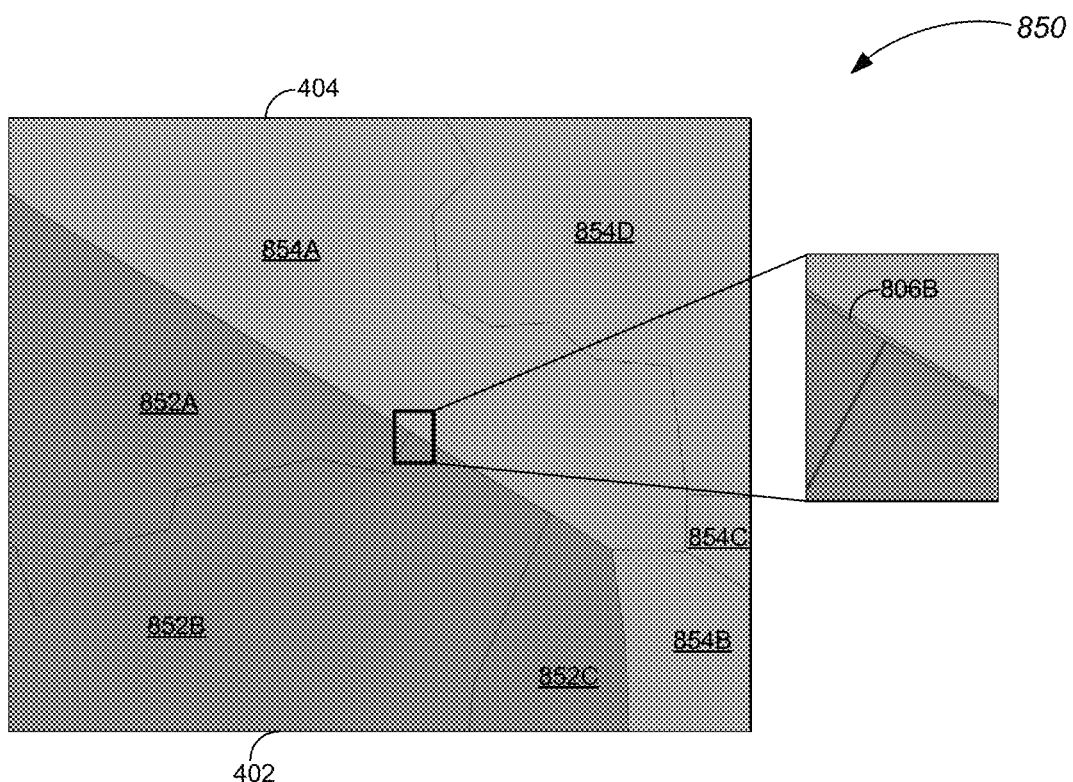

FIGS. 8A and 8B illustrate two representative map areas 800 and 850 having remaining gaps 806 that are formed between edges of two neighboring polygons 402 and 404 and not filled by geometric operations, in accordance with some implementations. Each of the map areas 800 and 850 includes a first polygon 402 and a second polygon 404, which are filled with distinct patterns. In a map user application 110, the first polygon 402 represents a first geographical region of a first country. The first polygon 402 encloses three first non-overlapping polygonal areas (e.g., areas 802A-802C in FIGS. 8A, areas 852A-852C in FIG. 8B), which represent three geographical sub-regions of the first geographical region. The first polygonal areas 802A-802C are connected to each other via first internal edges that match each other within the first polygon 402. The second polygon 404 does not include any non-overlapping polygonal area (e.g., in FIG. 8A) or includes a plurality of non-overlapping polygonal areas (e.g., areas 854A-854D in FIG. 8B), which represent different geographical sub-regions of the second geographical region. The second polygon 404 represents a second geographical region of a second country distinct from the first country. The second geographical region is neighboring and immediately adjacent to each of the three first polygonal areas 802A-802C.

In some implementations, geometric operations (e.g., union and intersection) is applied to match edges of the polygons 402 and 404. For example, the first polygonal area 802A and second polygon 404 are processed by the polygon joining process 400 and edge matching process 440 or 480 to form matching edges 804. Both forward edge matching 440 and reverse edge matching 480 are applied. In FIG. 8A, edges of the polygons 402 and 404 adjacent to a remaining gap 806A, and cannot be matched by the geometric operations, and the remaining gap 806A is left open between the region defined by the second polygon 404 and each of the first polygonal areas 802B and 802C. In FIG. 8B, one or more remaining gaps 806B, which are merely visible, are left open between the regions defined by the first and second polygons 402 and 404 due to floating point precision limitations. The one or more remaining gaps 806B are substantially small (e.g., less than an open area threshold). As such, the remaining gaps 806A and 806B are caused by different mechanisms, and cannot be fixed by the geometric operations in forward edge matching 440 and reverse edge matching 480, which are implemented to remove edge mismatching between the first and second polygons 402 and 404.

In some implementations, in accordance with a determination that the remaining gap 806 does not correspond to a water surface, the map user application 110 prompts a user to manually adjust polygon edges or vertices of the first polygon 402 and second polygon 404 adjacent to the remaining gap 806. Referring to FIG. 8A, the user may manually drag at least one of: (1) polygon edges 808 and 810 and vertices 814 and 816 of the first polygon 402 and (2) a polygon edge 812 and a vertex 818 of the second polygon 404 to remove the remaining gap 806 and/or create an overlap between the first and second polygons 402 and 404. After the overlap is created, regions defined by the first and second polygons 402 and 404 are combined to another joined polygon defined by an outline of the first and second polygons 402 and 404. A region defined by this joined polygon subtracts a region defined by the first or second polygon 402 or 404 to update the second or first polygon 404 or 402. Similarly, referring to FIG. 8B, the user may manually adjust polygon edges or vertices, of the first polygon 402 and second polygon 404, which are immediately adjacent to the remaining gaps 806B to eliminate the remaining gaps 806B.

Alternatively, in some implementations, in accordance with a determination that the remaining gap 806A or 806B does not correspond to a water surface and that an area of the remaining gap 806 is less than an open area threshold, the map user application 110 automatically incorporates the remaining gap 806A or 806B into either the first polygon 402 or the second polygon 404.

Figure 9:
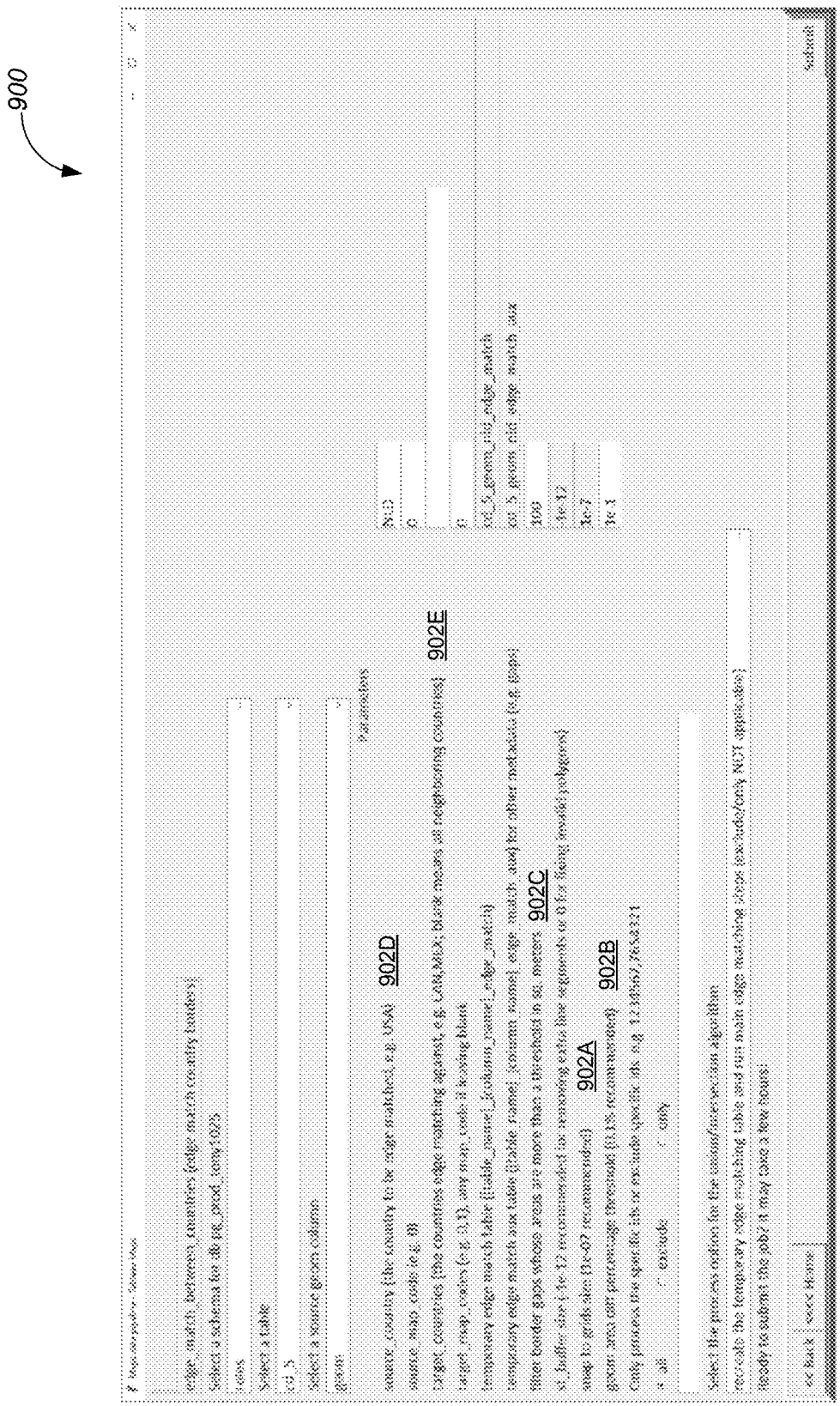
FIG. 9 illustrates a representative data visualization user interface of a map user application for entering edge matching settings, in accordance with some implementations.

FIG. 9 illustrates a representative data visualization user interface 900 of a map user application 110 for entering edge matching settings, in accordance with some implementations. The user interface 900 is displayed on a screen of a map user application 110, and configured to receive user input to specify the edge matching settings 902. The edge matching settings 902 include one or more of: (1) whether to snap vertices to a grid 902A, (2) whether to remove gaps or holes below an open area threshold 902B, (3) whether to check edge matching validity based on an edge matching validity criterion 902C, (4) a source country 902D to be edge matched, and (5) a target country 902E against which edge matching is applied. Referring to FIGS. 4A and 4B, the source country 902D to be edge matched corresponds to the second polygon 404 whose edges remains unchanged, and the target country 902E corresponds to the first polygon 402 whose edges are modified to match the edges of the second polygon 404. Stated another way, given the source country 902D, in accordance with a determination that a specific polygon corresponds to the source country 902D, edges of the specific polygon are not modified, and edges of any polygon connected to the specific polygon are modified to match the edges of the specific polygon. Also, given the target country 902E, in accordance with a determination that a specific polygon corresponds to the target country 902E, edges of the specific polygon are modified to match edges of another polygon to which the specific polygon is connected.

In some implementations, a Python UI tool is implemented to call PostGIS queries to process the map data on a PostgreSQL server based on the edge matching setting 902. Further, in some situations, geometric operations of a first polygon 402 and a second polygon 404 create one or more extra line segments on matching edges 408 or 422. Additional steps are executed in PostGIS. A first example operation is called by st_buffer(geom, $-1.0*10^{-12}$) to remove the extra line segments by shrinking the first and second polygons. A second example operation is called by st_snaptogrid(geom, $1.0*10^{-7}$) to remove remaining gaps between the first and second polygons 402 and 404 after the above st_buffer polygon shrinking operation. Under some circumstances, the second example operation is implemented to make associated map data consistent before the edge matching process 440 or 480. Such a precision setting (i.e., $1.0*10^{-7}$) in latitude and longitude maintains at least a centimeter precision and is adequate for mapping rendering. A third example operation is called by st_makevalid( ) to fix invalid polygons after running the first and second example operations.

Figure 10:
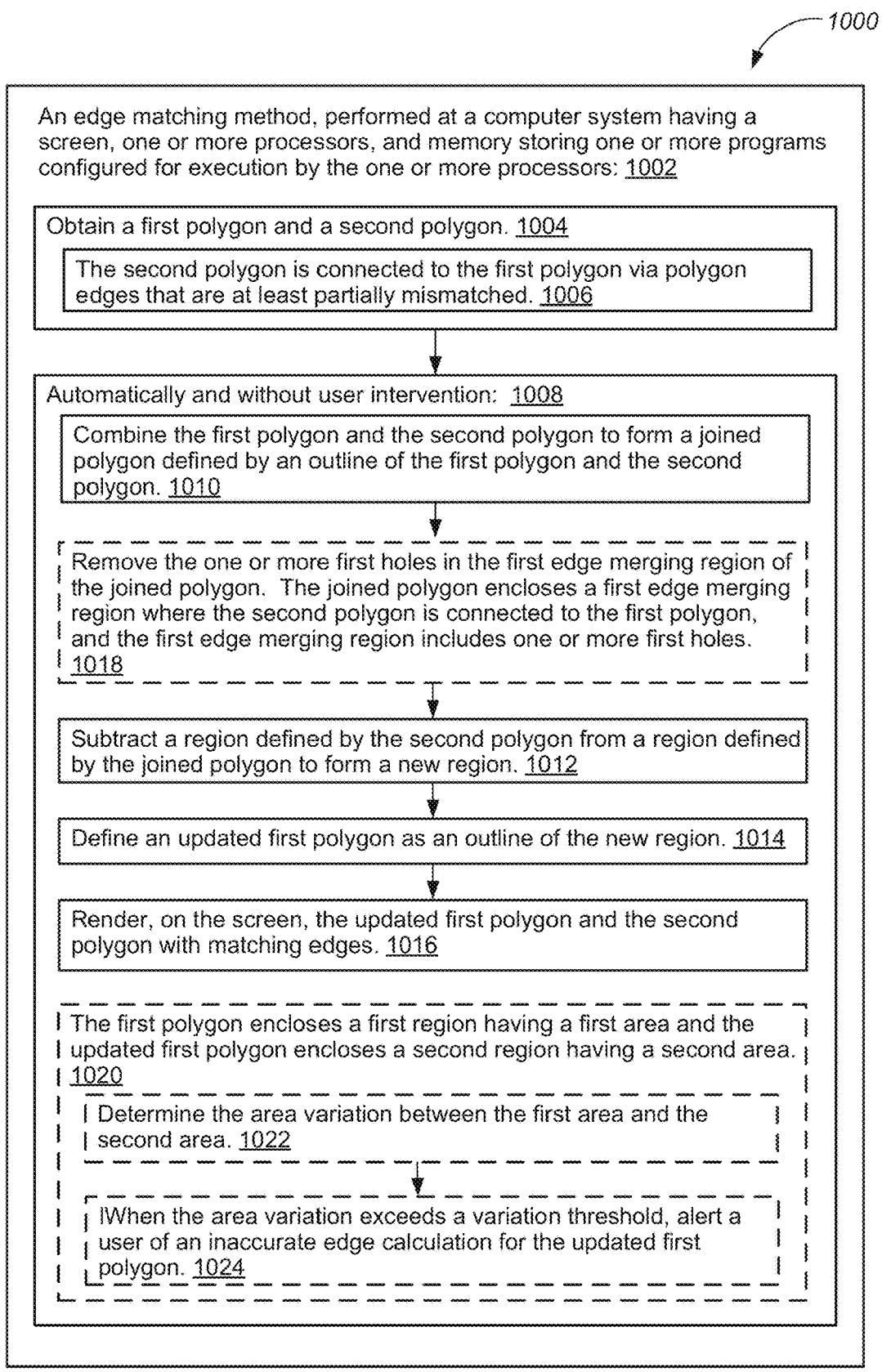
FIG. 10 illustrates a representative edge matching method 1000 for matching two polygons connected via polygon edges that are at least partially mismatched, in accordance with some implementations.

FIG. 10 illustrates a representative edge matching method 1000 for matching two polygons 402 and 404 connected via polygon edges that are at least partially mismatched, in accordance with some implementations. The method 1000 is implemented (1002) by a computer system 200 (e.g., a personal device 102, a data visualization server 104, or a combination thereof), and is optionally governed by instructions that are stored in a non-transitory computer readable storage medium and executed by one or more processors of the computer system 200. Each of the operations shown in FIG. 10 may correspond to instructions stored in the computer memory or computer readable storage medium (e.g., the memory 214 in FIG. 2) of the computer system 200. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1000 may be combined and/or the order of some operations may be changed.

The computer system 200 obtains (1004) the first polygon 402 and the second polygon 404. The second polygon 404 is connected (1006) to the first polygon 402 via polygon edges that are at least partially mismatched. Automatically and without user intervention (1008), the computer system 200 combines (1010) the first polygon 402 and the second polygon 404 to form a joined polygon 406 defined by an outline of the first polygon 402 and the second polygon 404, subtracts (1012) a region defined by the second polygon 404 from a region defined by the joined polygon 406 to form a new region, defines (1014) an updated first polygon 402 as an outline of the new region, and renders (1016), on the screen, the updated first polygon 402 and the second polygon 404, with matching edges.

In some implementations, the joined polygon 406 encloses (1018) a first edge merging region where the second polygon 404 is connected to the first polygon 402, and the first edge merging region includes one or more first holes. The computer system 200 removes the one or more first holes in the first edge merging region of the joined polygon 406, e.g., by creating an edge polygon to enclose the one or more first holes and combining the region defined by the joined polygon 406 and a region defined by the edge polygon to remove the one or more first holes.

In some implementations, the joined polygon 406 encloses a first edge merging region where the second polygon 404 is connected to the first polygon 402, and the first edge merging region includes one or more first overlaps between (i) a first region defined by the first polygon 402 and (ii) a second region defined by the second polygon 404.

In some implementations, the first polygon 402 encloses a plurality of non-overlapping first polygonal regions connected to each other via first internal edges that match each other. Further, in some implementations, the second polygon 404 encloses a plurality of non-overlapping second polygonal regions connected to each other via second internal edges that match each other.

Referring to FIG. 7, in some implementations, the computer system 200 obtains a third polygon 702 connected to the first polygon 402 and the second polygon 404 via respective edges that are at least partially mismatched. Automatically and without user intervention, the computer system 200 combines the joined polygon 406 and the third polygon 702 to form a second joined polygon 712 defined by an outline of the joined polygon 406 and the third polygon 702, subtracts the region defined by the joined polygon 406 from a region defined by the second joined polygon 712 to from a second new region 716, defines an updated third polygon 702 as an outline of the second new region 716, and renders, on the screen, the updated third polygon 702', the updated first polygon 402', and the second polygon 404. Further, in some implementations, the second joined polygon 712 encloses a second edge merging region where the third polygon 702 is connected to the first or second polygon 402 or 404, and the second edge merging region includes one or more second holes. The computer system 200 removes the one or more second holes in the second edge merging region of the second joined polygon 712. Additionally, the second joined polygon 712 has a second edge merging region where the third polygon 702 is connected to the first and second polygons 402 and 404, and the second edge merging region includes one or more second overlaps between (i) a region defined by the third polygon 702 and (ii) the region defined by the joined polygon 406.

In some implementations, the first polygon 402 encloses (1020) a first region having a first area and the updated first polygon 402 encloses a second region having a second area. The computer system 200 determines (1022) an area variation between the first area and the second area and in accordance with a determination that the area variation exceeds a variation threshold, alerts (1024) a user of an inaccurate edge calculation for the updated first polygon 402.

Referring to FIGS. 8A and 8B, in some implementations, after updating the first polygon 402, the computer system 200 identifies a remaining gap 806 between the updated first polygon 402 and the second polygon 404. The remaining gap 806 (e.g., the gap 806B in FIG. 8B) is optionally caused by floating point precision limitations. In accordance with a determination that the remaining gap 806 does not correspond to a water surface, the computer system 200 prompts a user to manually adjust polygon edges of the updated first polygon 402 and second polygon 404 adjacent to the remaining gap 806. In some implementations, after updating the first polygon 402, the computer system 200 identifies a remaining gap 806 between the updated first polygon 402 and the second polygon 404. In accordance with a determination that the remaining gap 806 does not correspond to a water surface and that an area of the remaining gap 806 is less than an open area threshold, the computer system 200 automatically includes the remaining gap 806 in either the updated first polygon 402 or the second polygon 404.

In some implementations, the computer system 200 executes a map user application 110 and displays a map on a first user interface of the map user application 110 on the screen. The map includes the first polygon 402 and the second polygon 404. Further, in some implementations, the computer system 200 receives a user command to zoom into a map area (e.g., map areas 330, 350, 360, 560, and 580) including at least some polygon edges where the second polygon 404 is connected to the first polygon 402. The updated first polygon 402 and the second polygon 404 are rendered with the matching edges 408 in response to the user command. Referring to FIG. 9, in some implementations, the computer system 200 receives user input to specify edge matching settings 902 on a second user interface 900 of the map user application 110. The edge matching settings 902 include one or more of: (1) whether to snap vertices to a grid 902A, (2) whether to remove gaps or holes below an open area threshold 902B, and (3) whether to check edge matching validity based on an edge matching validity criterion 902C.

In some implementations, the first polygon 402 and the second polygon 404 represent two neighboring geographical regions, and at least one of the first polygon 402 and the second polygon 404 includes a plurality of polygonal areas that represent a plurality of geographical sub-regions and are connected to each other via matching edges. Additionally, in some implementations, each geographic region has an associated border indicator that specifies which other regions it borders. The computer system 200 determines that the first polygon 402 and the second polygon border each other based on border indicators associated with the first geographical region and the second geographical region.

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described above with respect to FIGS. 3-9 are also applicable in an analogous manner to the method 1000 described here with respect to FIG. 10. For brevity, these details are not repeated here.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. An edge matching method, comprising:
at a computer system having a screen, one or more processors, and memory storing one or more programs configured for execution by the one or more processors:
   obtaining a first polygon and a second polygon, the second polygon connected to the first polygon via polygon edges that are at least partially mismatched;
   automatically and without user intervention:
      combining the first polygon and the second polygon to form a joined polygon defined by an outline of the first polygon and the second polygon;
      subtracting a region defined by the second polygon from a region defined by the joined polygon to form a new region;
      defining an updated first polygon as an outline of the new region;
      rendering, on the screen, the updated first polygon and the second polygon, with matching edges;
      after updating the first polygon, identifying a remaining gap between the updated first polygon and the second polygon; and
      in accordance with a determination that the remaining gap does not correspond to a water surface, prompting a user to manually adjust polygon edges of the updated first polygon and second polygon adjacent to the remaining gap.

2. The method of claim 1, wherein the joined polygon encloses a first edge merging region where the second polygon is connected to the first polygon, and the first edge merging region includes one or more first holes, the method further comprising:
removing the one or more first holes in the first edge merging region of the joined polygon.

3. The method of claim 2, wherein removing the one or more first holes further comprises:
creating an edge polygon to enclose the one or more first holes; and
combining the region defined by the joined polygon and a region defined by the edge polygon to remove the one or more first holes.

4. The method of claim 1, wherein the joined polygon encloses a first edge merging region where the second polygon is connected to the first polygon, and the first edge merging region includes one or more first overlaps between (i) a first region defined by the first polygon and (ii) a second region defined by the second polygon.

5. The method of claim 1, wherein the first polygon encloses a plurality of non-overlapping first polygonal regions connected to each other via first internal edges that match each other.

6. The method of claim 5, wherein the second polygon encloses a plurality of non-overlapping second polygonal regions connected to each other via second internal edges that match each other.

7. The method of claim 1, further comprising:
obtaining a third polygon connected to the first polygon and the second polygon via respective edges that are at least partially mismatched;
automatically and without user intervention:
   combining the joined polygon and the third polygon to form a second joined polygon defined by an outline of the joined polygon and the third polygon;
   subtracting the region defined by the joined polygon from a region defined by the second joined polygon to form a second new region;
   defining an updated third polygon as an outline of the second new region; and
   rendering, on the screen, the updated third polygon, the updated first polygon, and the second polygon.

8. The method of claim 7, wherein the second joined polygon encloses an edge merging region where the third polygon is connected to the first or second polygon, and the edge merging region includes one or more second holes, the method further comprising:
removing the one or more second holes in the edge merging region of the second joined polygon.

9. The method of claim 7, wherein the second joined polygon has an edge merging region where the third polygon is connected to the first and second polygons, and the edge merging region includes one or more second overlaps between (i) a region defined by the third polygon and (ii) the region defined by the joined polygon.

10. The method of claim 1, further comprising:
executing a map user application; and displaying a map on a first user interface of the map user application on the screen, the map including the first polygon and the second polygon.

11. A computer system having a screen, one or more processors, and memory, wherein the memory stores one or more programs configured for execution by the one or more processors, and the one or more programs comprise instructions for:
  obtaining a first polygon and a second polygon, the second polygon connected to the first polygon via polygon edges that are at least partially mismatched, wherein the first polygon encloses a first region having a first area;
  automatically and without user intervention:
    combining the first polygon and the second polygon to form a joined polygon defined by an outline of the first polygon and the second polygon;
    subtracting a region defined by the second polygon from a region defined by the joined polygon to form a new region;
    defining an updated first polygon as an outline of the new region, wherein the updated first polygon encloses a second region having a second area;
    rendering, on the screen, the updated first polygon and the second polygon, with matching edges;
    determining an area variation between the first area and the second area; and
    in accordance with a determination that the area variation exceeds a variation threshold, alerting a user of an inaccurate edge calculation for the updated first polygon.

12. The computer system of claim 11, the one or more programs further comprising instructions for:
  executing a map user application;
  displaying a map on a first user interface of the map user application on the screen, the map including the first polygon and the second polygon.

13. The computer system of claim 12, the one or more programs further comprising instructions for:
  receiving a user command to zoom into a map area including at least some polygon edges where the second polygon is connected to the first polygon, wherein the updated first polygon and the second polygon are rendered with the matching edges in response to the user command.

14. The computer system of claim 12, the one or more programs further comprising instructions for:
  receiving user input to specify edge matching settings on a second user interface of the map user application, wherein the edge matching settings include one or more of: (1) whether to snap vertices to a grid, (2) whether to remove gaps or holes below an open area threshold, and (3) whether to check edge matching validity based on an edge matching validity criterion.

15. The computer system of claim 12, wherein the first polygon and the second polygon represent two neighboring geographical regions, and at least one of the first polygon and the second polygon includes a plurality of polygonal areas that represent a plurality of geographical sub-regions and are connected to each other via matching edges.

16. The computer system of claim 15, wherein each geographic region has an associated border indicator that specifies which other regions it borders, and the method further comprises determining that the first polygon and the second polygon border each other based on border indicators associated with the first geographical region and the second geographical region.

17. A non-transitory computer readable storage medium that stores one or more programs configured for execution by a computer system having a screen, one or more processors and memory, the one or more programs comprising instructions for:
  obtaining a first polygon and a second polygon, the second polygon connected to the first polygon via polygon edges that are at least partially mismatched, wherein the first Polygon encloses a first region having a first area;
  automatically and without user intervention:
    combining the first polygon and the second polygon to form a joined polygon defined by an outline of the first polygon and the second polygon;
    subtracting a region defined by the second polygon from a region defined by the joined polygon to form a new region;
    defining an updated first polygon as an outline of the new region, wherein the updated first polygon encloses a second region having a second area;
    rendering, on the screen, the updated first polygon and the second polygon, with matching edges;
    determining an area variation between the first area and the second area; and
    in accordance with a determination that the area variation exceeds a variation threshold, alerting a user of an inaccurate edge calculation for the updated first polygon.

18. The non-transitory computer readable storage medium of claim 17, the one or more programs further comprising instructions for:
  after updating the first polygon, identifying a remaining gap between the updated first polygon and the second polygon; and
  in accordance with a determination that the remaining gap does not correspond to a water surface, prompting a user to manually adjust polygon edges of the updated first polygon and second polygon adjacent to the remaining gap.

19. The non-transitory computer readable storage medium of claim 17, the one or more programs further comprising instructions for:
  after updating the first polygon, identifying a remaining gap between the updated first polygon and the second polygon; and
  in accordance with a determination that the remaining gap does not correspond to a water surface and that an area of the remaining gap is less than an open area threshold, automatically including the remaining gap in either the updated first polygon or the second polygon.

20. The non-transitory computer readable storage medium of claim 17, wherein the joined polygon encloses a first edge merging region where the second polygon is connected to the first polygon, and the first edge merging region includes one or more first holes, the one or more programs further comprising instructions for:
  removing the one or more first holes in the first edge merging region of the joined polygon.

* * * * *